United States Patent
Hurry et al.

(10) Patent No.: US 11,507,929 B2
(45) Date of Patent: Nov. 22, 2022

(54) DIGITAL FIAT CURRENCY

(71) Applicant: Visa International Service Association, San Francisco, CA (US)

(72) Inventors: Simon J Hurry, Foster City, CA (US); Alexandre Pierre, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 108 days.

(21) Appl. No.: 16/678,947

(22) Filed: Nov. 8, 2019

(65) Prior Publication Data
US 2020/0151682 A1    May 14, 2020

Related U.S. Application Data

(60) Provisional application No. 62/758,430, filed on Nov. 9, 2018.

(51) Int. Cl.
*G06Q 20/06* (2012.01)
*G06Q 20/38* (2012.01)
(Continued)

(52) U.S. Cl.
CPC ..... *G06Q 20/0655* (2013.01); *G06Q 20/3829* (2013.01); *H04L 9/0637* (2013.01); *H04L 9/50* (2022.05); *H04L 2209/56* (2013.01)

(58) Field of Classification Search
CPC ........... G06Q 20/0655; G06Q 20/3829; G06Q 20/065; G06Q 2220/00; G06Q 20/10;
(Continued)

(56) References Cited

U.S. PATENT DOCUMENTS 5,910,987 A * 6/1999 Ginter ..................... H04L 63/10
                                                                  705/52
7,069,451 B1 * 6/2006 Ginter ..................... H04N 7/162
                                                                  713/168
(Continued)

FOREIGN PATENT DOCUMENTS

CN           106910072 A       6/2017
CN           107230053 A      10/2017
(Continued)

OTHER PUBLICATIONS

International Search Report and Written Opinion dated Apr. 9, 2020 for International Application No. PCT/US2019/060573, 12 pages.
(Continued)

*Primary Examiner* — Namrata Boveja
*Assistant Examiner* — Slade E Smith
(74) *Attorney, Agent, or Firm* — Kilpatrick Townsend & Stockton LLP

(57) ABSTRACT

Techniques are disclosed which include receiving, by a central entity computer, a request for digital currency. The request includes a serial number and a denomination of a physical currency. The central entity computer generates the digital currency for the denomination and linked to the serial number. The generating includes recording the digital currency on a blockchain. The central entity computer transmits a notification of the generation of the digital currency. The central entity computer causes removal of the physical currency from circulation in a fiat currency system.

17 Claims, 15 Drawing Sheets

(51) Int. Cl.
  *H04L 9/06* (2006.01)
  *H04L 9/00* (2022.01)
(58) Field of Classification Search
  CPC .. G06Q 20/3678; G06Q 40/04; G06Q 20/381;
       G06Q 20/389; G06Q 20/40; G06Q
       20/4016; G06Q 20/02; G06Q 20/0658;
       G06Q 20/36; G06Q 20/367; G06Q
       20/3825; G06Q 20/401; G06Q 20/223;
       G06Q 20/385; G06Q 20/382; G06Q
       20/38215; G06Q 20/405; G06Q 40/12;
       G06Q 20/027; G06Q 20/326; G06Q
       20/3674; G06Q 20/3676; G06Q 20/3827;
       G06Q 40/02; G06Q 20/102; G06Q
       20/1085; G06Q 20/204; G06Q 20/227;
       G06Q 20/3223; G06Q 20/40145; G06Q
       30/04; G06Q 40/06; G06Q 20/06; G06Q
       20/105; G06Q 20/14; G06Q 20/206;
       G06Q 20/30; G06Q 20/32; G06Q 20/322;
       G06Q 20/363; G06Q 20/384; G06Q
       20/386; G06Q 20/4014; G06Q 20/42;
       G06Q 2220/10; G06Q 30/02; G06Q
       30/0241; G06Q 30/06; G06Q 30/0601;
       G06Q 40/00; H04L 9/0637; H04L
       2209/38; H04L 2209/56; H04L 9/3239;
       H04L 9/3247; H04L 9/30; H04L 9/3213;
       H04L 9/0894; H04L 67/10; H04L 9/0643;
       H04L 9/0891; H04L 9/3263; H04L
       63/126; H04L 67/1042; H04L 9/006;
       H04L 9/06; H04L 9/3218; H04L 63/0236;
       H04L 63/029; H04L 63/08; H04L 63/10;
       H04L 63/101; H04L 63/12; H04L 9/08;
       H04L 9/0861; H04L 9/0897; H04L 9/321;
       H04L 9/3242; G06F 16/27; G06F
       16/1815; G06F 16/1834; G06F 16/1805;
       G06F 16/28; G06F 21/64; G06K 9/00087;
       G06N 20/00; G07F 7/0833
  USPC .......................................................... 705/41
  See application file for complete search history.

(56) References Cited

U.S. PATENT DOCUMENTS

| | | | |
|---|---|---|---|
| 10,084,607 B2 | 9/2018 | Toll et al. | |
| 10,269,009 B1* | 4/2019 | Winklevoss | G06Q 20/36 |
| 10,354,325 B1* | 7/2019 | Skala | G06Q 20/065 |
| 10,373,129 B1* | 8/2019 | James | H04L 9/3247 |
| 10,373,158 B1* | 8/2019 | James | G06Q 40/04 |
| 10,438,290 B1* | 10/2019 | Winklevoss | G06Q 20/389 |
| 10,762,506 B1* | 9/2020 | Cash | G06Q 20/40145 |
| 10,783,501 B1* | 9/2020 | Ramanathan | G06Q 20/0655 |
| 10,929,842 B1* | 2/2021 | Arvanaghi | H04L 9/50 |
| 2003/0085271 A1* | 5/2003 | Laskowski | G07D 7/12 |
| | | | 235/379 |
| 2005/0038756 A1* | 2/2005 | Nagel | B42D 25/29 |
| | | | 705/76 |
| 2010/0306087 A1* | 12/2010 | Wilkes | G06Q 40/04 |
| | | | 705/37 |
| 2010/0306092 A1* | 12/2010 | Wilkes | G06Q 20/40 |
| | | | 705/37 |
| 2011/0307487 A1* | 12/2011 | Guralnik | G06Q 30/02 |
| | | | 707/765 |
| 2012/0078693 A1* | 3/2012 | Wilkes | G06Q 30/02 |
| | | | 705/44 |
| 2012/0101950 A1 | 4/2012 | Dharmapalan | |
| 2012/0138677 A1* | 6/2012 | Ma | G06Q 20/1085 |
| | | | 235/379 |
| 2012/0259772 A1* | 10/2012 | Lee | G06Q 20/10 |
| | | | 705/39 |
| 2013/0262295 A1* | 10/2013 | Narayanan | G06Q 20/384 |
| | | | 705/39 |
| 2015/0170112 A1* | 6/2015 | DeCastro | G06Q 20/381 |
| | | | 705/39 |
| 2015/0193744 A1* | 7/2015 | Adleman | H04L 9/3247 |
| | | | 705/69 |
| 2015/0269541 A1* | 9/2015 | MacGregor | H04L 9/321 |
| | | | 705/39 |
| 2015/0371224 A1* | 12/2015 | Lingappa | G06Q 20/401 |
| | | | 705/71 |
| 2015/0379491 A1* | 12/2015 | Ma | G07F 19/209 |
| | | | 235/379 |
| 2016/0342977 A1* | 11/2016 | Lam | G06Q 20/0658 |
| 2017/0031676 A1 | 2/2017 | Cecchetti et al. | |
| 2017/0293912 A1* | 10/2017 | Furche | G06Q 20/3825 |
| 2017/0308872 A1* | 10/2017 | Uhr | G06Q 20/363 |
| 2017/0344988 A1 | 11/2017 | Cusden et al. | |
| 2018/0204191 A1* | 7/2018 | Wilson | H04L 9/30 |
| 2018/0204192 A1* | 7/2018 | Whaley | G06Q 20/4016 |
| 2018/0227293 A1* | 8/2018 | Uhr | G06F 21/64 |
| 2018/0268382 A1 | 9/2018 | Wasserman | |
| 2018/0330342 A1* | 11/2018 | Prakash | G06Q 20/38215 |
| 2019/0108517 A1* | 4/2019 | Rose | G06Q 20/38215 |
| 2019/0213584 A1* | 7/2019 | Shanmugam | G06Q 20/38215 |
| 2019/0236565 A1* | 8/2019 | Song | G06Q 20/3678 |
| 2019/0251199 A1* | 8/2019 | Klianev | G06F 16/2308 |
| 2019/0303886 A1* | 10/2019 | Kikinis | H04L 9/0637 |
| 2020/0027084 A1* | 1/2020 | Groarke | H04L 9/30 |
| 2020/0097927 A1* | 3/2020 | Groarke | G06Q 20/0658 |
| 2020/0349578 A1* | 11/2020 | Stehle | G07D 11/30 |

FOREIGN PATENT DOCUMENTS

| | | |
|---|---|---|
| CN | 107230074 A | 10/2017 |
| CN | 107392605 A | 11/2017 |
| KR | 10-2016-0009301 A | 1/2016 |
| KR | 10-1591244 B1 | 2/2016 |
| KR | 10-2017-0015655 A | 2/2017 |
| KR | 10-1837166 B1 | 3/2018 |
| WO | 2016/161073 A1 | 10/2016 |
| WO | 2017/027801 A1 | 2/2017 |

OTHER PUBLICATIONS

Amaden et al., "The Libra Blockchain", Libra Association, Jun. 2019, pp. 1-29.

Castro et al., "Practical Byzantine Fault Tolerance", Proceedings of the Third Symposium on Operating System Design and Implementation, Feb. 1999, pp. 1-14.

Ongaro et al., "In Search of Understandable Consensus Algorithm", Proceedings of USENIX ATC '14, Jun. 2014, pp. 305-319.

Kiayias et. al, "Ouroboros: A Provably Secure Proof-Of-Stake Blockchain Protocol", Jul. 20, 2019, pp. 1-67.

Wood, Gavin, "Ethereum: A Secure Decentralised Generalised Transaction Ledger", EIP-150 Revision (a04ea02—Sep. 30, 2017), pp. 1-34.

Office Action mailed for Canadian Application No. 3,119,189 dated Jul. 7, 2021, 6 pages.

Lipton et al., "Digital Trade Coin: Towards a More Stable Digital Currency", Royal Society Open Science, Available online at: https://royalsocietypublishing.org/doi/pdf/10.1098/rsos.180155, Jun. 18, 2018, 15 pages.

Notice of Decision to Grant received for JP Appl. No. 2021-524386 dated Oct. 7, 2021, 2 pages.

Office Action received for KR Appl. No. 10-2021-7017015 dated Oct. 5, 2021, 14 pages.

Extended European Search Report dated Jun. 29, 2022 for EP Application No. 19881510.2, 5 pages.

Office Action dated Jun. 28, 2022 for Chinese Appl. No. 201980073814.9, 26 pages.

Office Action received for Brazilian Appl. No. 112021009000-2 dated Jul. 26, 2022, 9 pages.

(56) References Cited

OTHER PUBLICATIONS

Office Action received for Brazilian Appl. No. 122022003499-3, dated Jul. 26, 2022, 9 pages.

* cited by examiner

DIGITAL FIAT CURRENCY

CROSS-REFERENCE TO RELATED APPLICATIONS

This application is a Non-Provisional application and claims benefit of priority of U.S. Provisional Application No. 62/758,430, filed Nov. 9, 2018, the entire contents of which is incorporated herein by reference for all purposes.

BACKGROUND

A cryptocurrency is a digital or virtual currency designed to work as a medium of exchange. Conventional cryptocurrencies use cryptography to secure and verify transactions as well as to control the creation of new units of a particular cryptocurrency.

Many cryptocurrencies are decentralized. Typical cryptocurrency infrastructures use nodes to generate and validate transactions without one node having more control than any other node.

Cryptocurrency systems have advantages over fiat currency systems. For example, cryptocurrency money transfers can also be faster than conventional fiat currency money transfers. Lastly, because some cryptocurrencies use blockchains, such cryptocurrencies are often trusted since blockchains are immutable records of transactions.

While cryptocurrencies have advantages, they are generally not subject to regulation like fiat currencies. Further, it is not practical for governments to wholly convert their fiat currency systems entirely to cryptocurrencies, since cryptocurrencies require the use of electronic devices. Some segment of the population of a country may not have electronic devices so a complete conversion of fiat currencies to cryptocurrencies is not practical.

Embodiments of the invention address this and other problems, both individually and collectively.

BRIEF SUMMARY

Embodiments provide a digital fiat currency system for managing digital fiat currency generated based on physical currency. Embodiments provide a private permissioned distributed ledger platform for managing the digital currency. The digital currency may be recorded to a blockchain in association with data such as a serial number of a corresponding physical currency, allowing a central entity to manage the volume and value of the digital currency.

In some embodiments, a computer-implemented method may include receiving, by a central entity computer, a request for digital currency, the request comprising a serial number and a denomination of a physical currency; generating, by the central entity computer, the digital currency for the denomination and linked to the serial number, wherein the generating comprises recording the digital currency on a blockchain; transmitting, by the central entity computer, a notification of the generation of the digital currency; and causing, by the central entity computer, removal of the physical currency from circulation in a fiat currency system.

In some embodiments, the method may further include associating the digital currency with a digital wallet using a private key stored to the digital wallet. In some embodiments, the private key of the digital wallet is stored on a chip of a smart card or a secure element of a user device.

In some embodiments, the method may further include receiving, by the central entity computer from a transaction processing network, a trusted certificate for the central entity computer, and using the trusted certificate to generate the digital currency. In some embodiments, prior to transmitting the notification of the generation of the digital currency, the recording of the digital currency on the blockchain is validated by a plurality of validating entities. In some embodiments, the digital currency is recorded on the blockchain using a public key of the central entity computer. In some embodiments, causing the removal of the physical currency from circulation includes physically destroying the physical currency, the physical currency being fiat currency.

In some embodiments, the request for digital currency is a first request and the physical currency is a first physical currency, and the method further includes receiving, by the central entity computer, a second request for digital currency, the second request comprising a serial number and a denomination of a second physical currency, wherein the serial number and the denomination of the second physical currency are the same as the serial number and the denomination of the first physical currency; determining, by the central entity computer, that the digital currency corresponding to the serial number and denomination is already recorded on the blockchain; and refraining from generating a second digital currency based on the second request.

In some embodiments, the blockchain includes a plurality of blocks, at least one block, of the plurality of blocks, storing data for a plurality of transactions, the plurality of transactions including a first record indicating that the digital currency for an amount associated with the denomination has been created for public key associated with a digital wallet. In some embodiments, the blockchain includes a plurality of blocks, at least one block, of the plurality of blocks, storing data for a plurality of transactions, the plurality of transactions including a second record recording the removal of the physical currency from circulation. In some embodiments, recording the digital currency on the blockchain generates a record in a block in the blockchain, the record comprising a currency type of the physical currency and the serial number of the physical currency.

In some embodiments, a central entity computer includes a processor; and a non-transitory computer-readable medium comprising code, executable by the processor, for implementing a method comprising: receiving, by the central entity computer, a request for digital currency, the request comprising a serial number and a denomination of a physical currency; generating, by the central entity computer, the digital currency for the denomination and linked to the serial number, wherein the generating comprises recording the digital currency on a blockchain; transmitting, by the central entity computer, a notification of the generation of the digital currency; and causing, by the central entity computer, removal of the physical currency from circulation in a fiat currency system.

In some embodiments, a computer-implemented method includes receiving, by a blockchain node storing a blockchain, a request to record an action relating to removal of physical currency with a denomination from a fiat currency system; recording, by the blockchain node, a record of the action relating to the removal of the physical currency with the denomination from the fiat currency system to the blockchain; receiving, by the blockchain node, a request to record digital currency in an amount equal to the denomination, the digital currency associated with a public key of a user; and recording, by the blockchain node, the digital currency in an amount equal to the denomination.

In some embodiments, the method further includes receiving, by the blockchain node, a request to record a transaction between a first user and a second user, the request including a public key of the first user, a public key of the second user, and a transaction amount; recording a record of the transaction between the first user and the second user, the record of the transaction including a public key of the first user, a public key of the second user, and the transaction amount in a block along with the action relating to removal of physical currency with a denomination from a fiat currency system to the blockchain. In some embodiments, the record further includes a currency type of the physical currency. In some embodiments, the digital currency in the amount equal to the denomination is recorded to a record, the record further comprising a currency type of the physical currency and a serial number of the physical currency.

In some embodiments, the blockchain node is a bank server computer. In some embodiments, the request is signed using a private key of the first user. In some embodiments, the method further comprises validating a digital signature of the first user using the public key of the first user. In some embodiments, the method further comprises reaching consensus with a plurality of additional blockchain nodes. In some embodiments, the consensus is reached using one of: proof of stake, a byzantine fault tolerant algorithm, or a crash-fault tolerant algorithm. In some embodiments, the blockchain node uses a certificate to gain permission to write to the blockchain.

DETAILED DESCRIPTION

Figure 1:
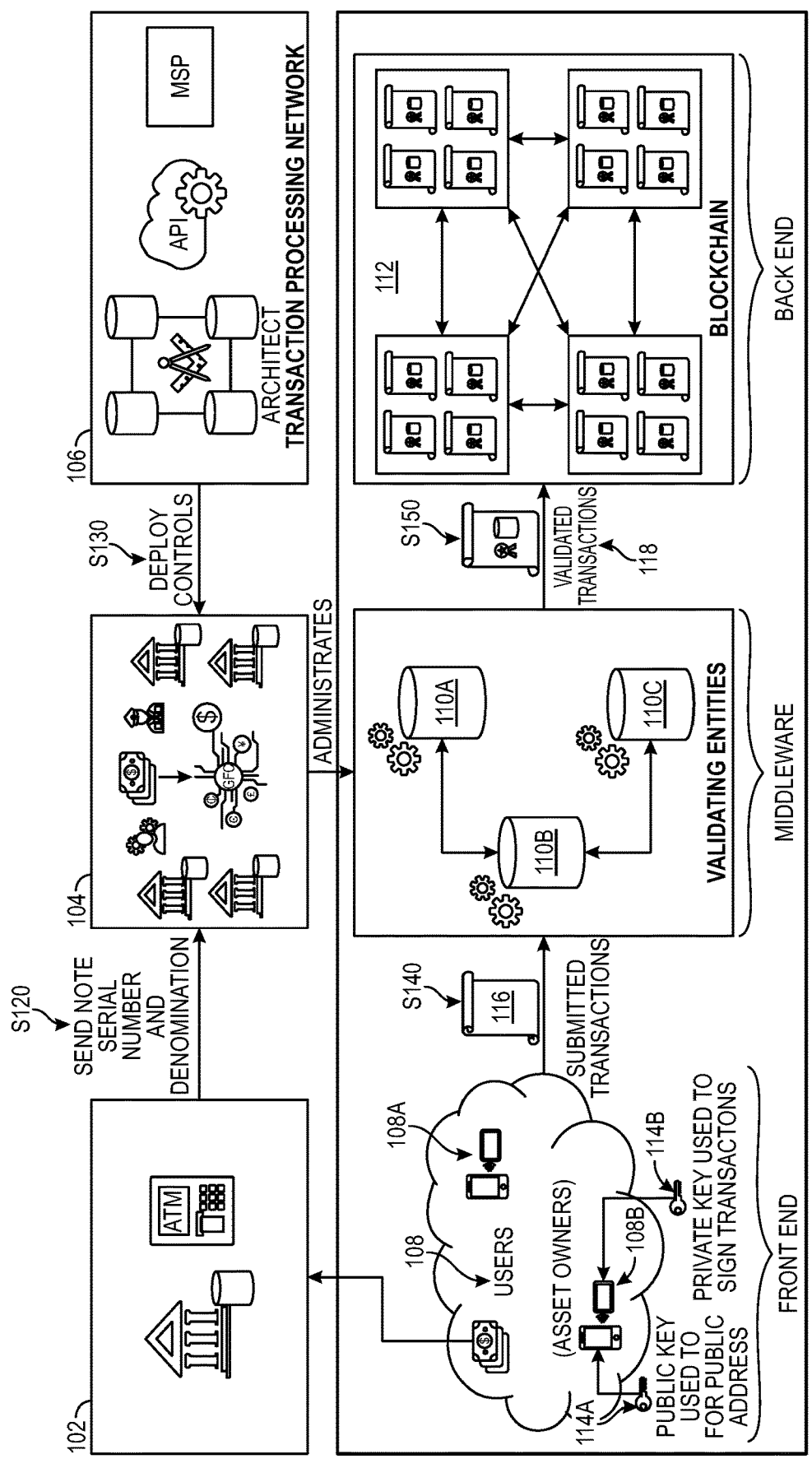
FIG. 1 illustrates an example of an ecosystem for managing digital fiat currency, according to various embodiments.

Embodiments provide a digital fiat currency, which may be used to convert physical currency into digital currency. The digitalization of cash may enable a user to perform digital transactions using distributed ledger technology. Transactions to transfer the digital currency between different users may take place in real time and atomically, without the need for clearing or settlement otherwise required for transactions using conventional currency. The digital fiat currency may remain pegged to fiat currency exchange rates to avoid any fluctuations in value.

According to various embodiments, the digital currency may be issued based on the serial number of the physical currency. According to various embodiments, the digital currency may be associated with, and traceable using, the serial numbers of the physical currency. According to various embodiments, a transaction processing network may assign the role of administrator to a central entity, and the central entity may have exclusive permission to transform physical fiat currency to digital fiat currency.

According to the exemplary embodiments discussed herein, the payment ecosystem may become entirely (e.g. 100%) digital. According to various embodiments, cash may be removed from the markets in a frictionless manner and the payment ecosystem may be improved. Users may hold digital currency with the same denomination as the local physical currency (e.g., $100 for User A in America; 200 pesos for User B in Mexico, and so forth) in order to perform transactions in a secure, fast and reliable way.

Embodiments of the present invention allow redeeming cash to digital fiat currency regulated by the central entity. Embodiments further provide a permissioned, shared, immutable transaction replicated ledger across the industry. Embodiments may record bank note serial numbers and denominations to prevent duplicate bank notes. Embodiments may ensure transaction security by storing transaction signing private keys on a chip or mobile device Secure Element (when available). Embodiments may also allow for user anonymity.

Embodiments allow the transactions using digital fiat currency to be processed and completed immediately without requiring settlement and clearing processing. According to various embodiments, transactions using digital fiat currency may be processed and completed immediately between currencies without requiring cross-border remittances. In addition, when an entity conducts a transaction using digital fiat currency, the transaction is a blockchain transaction, hence is traceable. According to various embodiments, entities may transact anonymously on the digital currency platform using digital fiat currency. In some embodiments, entities may be required to identify themselves to conduct transactions on the digital currency platform using digital fiat currency.

Prior to discussing specific embodiments of the invention, some terms may be described in detail.

A "central entity" may refer to an entity that regulates something. A central entity may be a central bank, which regulates a monetary supply. A central entity may implement a monetary policy and issue currency. A central entity may maintain exclusive rights to create or destroy currency in a region such as a nation. A central entity may be associated with a government of such a region.

A "physical currency" may refer to currency that is available in a physical form, such as in the form of cash, such as bills or coins. Physical currency is a medium of exchange for goods or services. Physical currency is typically issued and regulated by a central entity.

A "digital currency" may refer to currency that is available in electronic form. Like physical currency, digital currency can be exchanged for goods or services. Digital currencies include cryptocurrencies, which are a type of digital currency secured by cryptography.

"Fiat currency" is currency that is a currency without intrinsic value that has been established as money, often by government regulation.

A "blockchain" may is a growing list of records linked by cryptography. In some embodiments, a blockchain may be in a digital ledger that is on many computing devices. The transactions may be recorded on a set of blocks. Each block may contain a hash of one or more previous blocks. Accordingly, the record of each transaction cannot be altered retroactively without the alteration of all subsequent blocks and the collusion of the network.

A "cryptocurrency network" may include a one or more computers that participate in maintaining a cryptocurrency ledger. In some cryptocurrency networks, the distributed cryptocurrency ledger may comprise a blockchain. Examples of a cryptocurrency network may include networks of computers that manage any suitable cryptocurrency including, but not limited to, Bitcoin, Litecoin, Ethereum, Zcash, Dash, Ripple, and Monero.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "transaction processing network" may be data processing subsystems, networks, and operations used to support and deliver authorization services, exception file services, and (if applicable) clearing and settlement services. An example of a transaction processing system is VisaNet™. Transaction processing systems such as VisaNet™ are able to process credit card transactions, debit card transactions, and other types of commercial transactions. The transaction processing network may include a server computer.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "digital wallet" may be an electronic device or online service that allows an individual to conduct online transactions. A digital wallet may store user profile information, payment credentials, bank account information, cryptocurrency account information, one or more digital wallet identifiers and/or the like and can be used in a variety of transactions, such as but not limited to eCommerce transactions, social network transactions, money transfer/personal payments, mobile commerce transactions, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "hash" or "hash value" is a value (generally of fixed size) generated from data of arbitrary size (e.g., a string of text). A hash may be, for example, a numerical or string value. The hash may be significantly smaller than the data itself. A hash may be generated by a "hash function" such that it is extremely unlikely that some other data will produce the same hash value, and it is extremely difficult to reconstruct the data based on the hash value.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 illustrates a schematic overview of a system 100 for managing digital fiat currency, in accordance with some embodiments. As illustrated in FIG. 1, the system 100 may include a central entity 104, a blockchain 112, one or more validating entities (e.g., validating entity A 110A, validating entity B 110B, and validating entity C 110C), and a transaction processing network 106. The system 100 may further include a redeeming entity 102 and one or more users 108.

In some embodiments, digital fiat currency is managed using a blockchain 112. As described above, a blockchain 112 is a type of distributed ledger stored and validated by a plurality of distributed nodes, wherein information is encrypted and recorded in linked blocks. Alternatively, or additionally, the digital fiat currency may be managed using another type of distributed ledger technology such as a hashgraph. Entities within the system 100 may act as blockchain nodes (e.g., validating entities 110A, 110B, and 110C, the transaction processing network 106, and the central entity 104). The blockchain nodes may each store the blockchain 112 and record and monitor transactions on the blockchain 112.

In some embodiments, the transaction processing network 106 manages permissions across the system 100. The transaction processing network 106 may identify specific roles an entity (e.g., central entity 104, users 108, validating entities 110A-110C, etc.) might play, and sets the basis for defining access privileges, which may be in the context of a network and channel (e.g. channel admins, readers, writers, etc.). In addition, the transaction processing network 106 can allow for revoking permissions and/or identifying a list of entities that have had permissions revoked.

In some embodiments, the transaction processing network 106 acts as a certificate authority component for managing the network identities of parties such as the central entity 102, validating entities 110A-110C, and users 108. For example, the validating entities 110A-110C are banks (organizations), each of which may have particular permissions. The central entity 104 may have a different set of permissions, and users 108 may have another set of permissions. The requirement for a permissioned identity for every entity enables control over network activity, and guarantees that every transaction is ultimately traceable to a registered entity. The transaction processing network 106 may issue a root certificate to each member (organization or individual) that is authorized to join the network. This certificate-based control over network membership and actions enables members to restrict access to private and confidential channels, applications, and data, by specific user identities.

The transaction processing network 106 may act as the trusted architect of the private permissioned distributed ledger technology. The transaction processing network may act as a smart contract deployer. A smart contract may control the execution of a transaction digitally by recording the terms of the transaction on the blockchain. Smart contracts may function as a trusted distributed application that gains its security/trust from the blockchain and the underlying consensus among peers. A smart contract may include data which is signed and has consensus associated with validation among nodes in the blockchain. This prevents the smart contract from being repudiated.

In some embodiments, The transaction processing network 106 may act as a Membership Service Provider (MSP). As MSP, transaction processing network 106 can manage permissions on the blockchain 112. Different entities may, at a given time, have rights to create, transfer, and/or validate transactions on the blockchain 112 corresponding to digital fiat currency.

In some embodiments, the central entity 104 is an entity, such as a central bank, that is responsible for the production and distribution of money and credit in a region (e.g., a nation). Central entities 104 may have exclusive permission to transform physical currency into digital currency in order to regulate the value of the digital currency. The central entity 104 may be a node of the blockchain network which may include the blockchain 112. The central entity 104 may control when, and how much, digital currency is generated. The central entity 104 may further manage the destruction of units of physical currency in connection with the generation of corresponding units of digital fiat currency. For example, every time a dollar worth of digital fiat currency is generated, the central entity 104 ensures that a corresponding physical dollar bill is removed from circulation, in order to regulate the value of the digital fiat currency. Such functionality may be performed by a central entity computer 200, as further described below with respect to FIG. 2.

In some embodiments, the central entity 104 may be a node on the blockchain network. The central entity 104 may have an account on the blockchain 112, and digital currency may be assigned to the account of the central entity 104. The central entity 104 may maintain certificates and/or cryptographic keys for managing entries on the blockchain. Specifically, the central entity 104 may store a public and private key to generate and permit validation of signatures conveying ownership of digital currency transformed from retired bank notes.

The validating entities (e.g., validating entity A 110A, validating entity B 110B, and validating entity C 110C), are blockchain nodes, which may be peers such as banks. The validating entities 110A-110C may include functionality to validate transactions. The validating entities 110A-110C may receive submitted transactions 116, and, upon validating the submitted transactions 116, record validated transactions 118 to the blockchain 112. The validating entities may further include functionality to validate and record transactions, both related to digital currency and physical currency. The validating entities 110A-110C may reach consensus with one another to finalize a transaction, as described in further detail below.

The redeeming entity 102 may accept physical currency for exchange for digital fiat currency. The redeeming entity 102 may be an Automated Teller Machine (ATM) and/or a bank location. For example, a user may provide physical currency to an ATM or to a teller at a bank window. The redeeming entity 102 may transmit information characterizing the physical currency to the central entity 104 and/or other nodes of the blockchain. The redeeming entity 102 may further safeguard and transport the physical currency to an appropriate party to remove physical currency from circulation. For example, the redeeming entity 102 may transmit physical currency to the central entity 104 or an agent of the central entity 104 to destroy physical currency which has been converted to digital currency.

The users 108 may be entities, such as individuals, that hold digital currency at a particular time. Each user 108 may have a corresponding user device (e.g., user device 108A and user device 108B on which a digital wallet is stored. A digital wallet may store keys 114A and 1146 used to sign and validate transactions assigning the digital currency to a particular digital wallet of a user. Embodiments may use a contactless chip (by tapping card on mobile phone) or secure element to store the private key used by users in order to sign the transactions on the blockchain. A public/private key pair may be assigned to a digital wallet associated with a user. Such a keys may be referred to as keys of the corresponding user.

Figure 2:
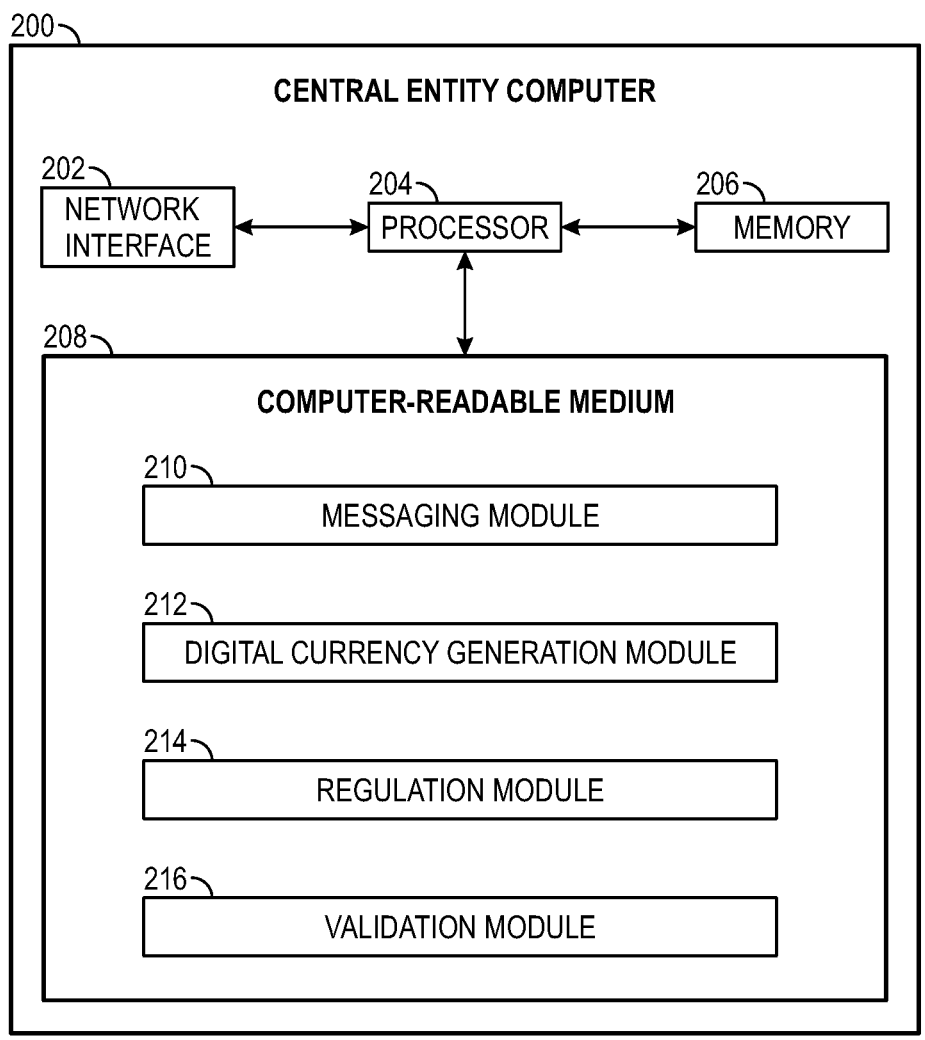
FIG. 2 illustrates a block diagram of a central entity computer, according to various embodiments.

FIG. 2 illustrates a block diagram of a central entity computer 200, according to various embodiments. Central entity computer 200 includes a network interface 202, processor 204, memory 206, and computer-readable medium 208.

The processor 204 may be implemented as one or more integrated circuits (e.g., one or more single core or multicore microprocessors and/or microcontrollers). The processor 204 may be used to control the operation of the central entity computer 200. The processor 204 can execute a variety of programs in response to program code or computer-readable code stored in memory 206. The processor 204 may include functionality to maintain multiple concurrently executing programs or processes.

The network interface 202 may be configured to connect to one or more communication networks to allow the central entity computer 200 to communicate with other entities such as the redeeming entity 102, users 108, etc. For example, communication with the redeeming entity 102 can be direct, indirect, and/or via an application programming interface (API).

The memory 206 may be implemented using any combination of any number of non-volatile memories (e.g., flash memory) and volatile memories (e.g., DRAM, SRAM), or any other non-transitory storage medium, or a combination of media.

The computer-readable medium 208 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 208 may be any combination of such storage or transmission devices.

The computer-readable medium 208 may comprise software code stored as a series of instructions or commands. The computer-readable medium 208 comprises code, executable by the processor 204, to implement a method comprising: receiving, by a central entity computer, a request for digital currency, the request comprising a serial number and a denomination of a physical currency; generating, by the central entity computer, the digital currency for the denomination and linked to the serial number, wherein the generating comprises recording the digital currency on a blockchain; transmitting, by the central entity computer, a notification of the generation of the digital currency; and causing, by the central entity computer, removal of the physical currency from circulation in a fiat currency system.

The computer-readable medium 208 may include a communication module 210, a digital currency generation module 212, a regulation module 214, and a validation module 216. Each of these modules may include code configured to perform the functions described below in conjunction with the processor 204.

The communication module 210 may comprise code that causes the processor 204 to generate messages, forward messages, reformat messages, and/or otherwise communicate with other entities.

The digital currency generation module 212 may comprise code that causes the processor 204 to generate digital currency. The digital currency generation module 212 may include code configured to, in cooperation with the processor 204, construct deploy transactions and submit deploy transactions to a blockchain, resulting in the generation of digital currency.

The regulation module 214 may comprise code that causes the processor 204 to regulate an amount of currency in circulation. The regulation module 214 may, in cooperation with the processor 204, evaluate an amount of digital and/or physical currency in circulation. The regulation module 214 may, in cooperation with the processor 204, determine that digital and/or physical currency should be removed from circulation. In the context of digital currency, the regulation module 214, in cooperation with the processor 204, may determine that a particular digital currency unit should be added to or removed from the blockchain. In the context of physical currency, the regulation module 214 may, in cooperation with the processor 204, determine that physical currency should be removed from circulation, and cause the removal from circulation of the physical currency. The regulation module 214 may, for example, direct another entity to shred, burn, or store the physical currency.

The validation module 216 may comprise code that causes the processor 204 to validate transactions on the blockchain. The validation module 216 may include code configured to, in cooperation with the processor 204, validate digital signatures using public keys of signing entities. The digital currency generation module 212 may include code configured to, in cooperation with the processor 204, reach consensus with other nodes on the blockchain. The consensus mechanism may vary depending on the protocol implemented. Some example consensus mechanisms, described further below, are proof of stake, Byzantine fault tolerant algorithms, and crash-fault tolerant algorithms.

Figure 3:
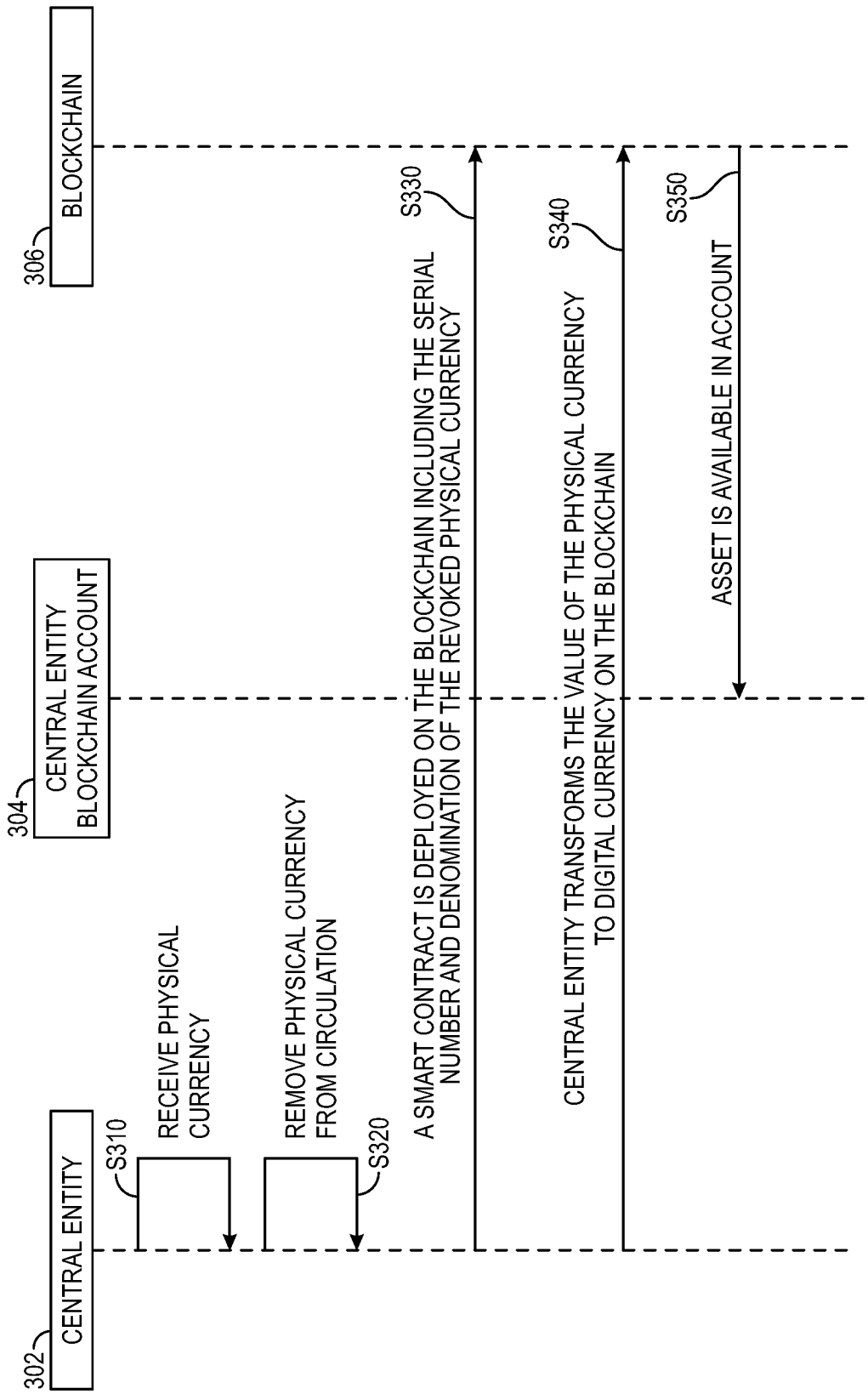
FIG. 3 illustrates an example of a flowchart of steps illustrating a central entity transforming cash into digital fiat currency, according to various embodiments.

FIG. 3 illustrates a flowchart illustrating an example of a method 300 for transforming physical currency into digital fiat currency, according to various embodiments. The method 300 may be performed by a central entity 302 (which may be substantially similar to the central entity 104 of FIG. 1), via a blockchain 306 (which may be substantially similar to the blockchain 112 of FIG. 1). Method 300 may be performed, for example, when physical currency held by the central entity 302 is unusable. A physical bill may become torn or otherwise worn out, and the central entity 302 may retire the physical currency. As another example, method 300 may be performed when a bank redeems a physical currency for digital currency.

At S310, the central entity 302 receives physical currency. The central entity 302 may receive physical currency (in unusable or usable form) from a bank. The central entity may determine that the physical currency should be converted to digital currency. For example, the central entity 302 may inspect the physical currency and determine that the physical currency is unusable. As another example, the central entity 302 may receive a request from a local bank to convert the physical currency to digital currency.

At S320, the central entity 302 removes the physical currency from circulation. The central entity 302 may destroy the physical currency. The central entity 302 may, for example, shred or incinerate the physical currency. Alternatively, or additionally, the central entity 302 may cause another entity, such as an agent of the central entity 302 (e.g., a shredding company) to destroy the physical currency at the direction of the central entity 302 (e.g., transmit a message to the agent of the central entity 302 requesting destruction of the physical currency). Alternatively, or additionally, the central entity may remove the physical currency from circulation by storing the physical currency in a secure location.

In some embodiments, one or more blockchain nodes may further record an action relating to the removal of the physical currency with the denomination from the fiat currency system from the blockchain. A blockchain node may store a record indicating that a particular unit of physical currency has been removed from circulation. For example, prior to destroying the physical currency, the central entity 302 may record information about the physical currency including a denomination (e.g., $1, $5, $20, etc.) of the physical currency, a serial number of the physical currency, a location, and/or the like.

At S330, the central entity 302 deploys a smart contract on the blockchain. The smart contract includes the serial number and the denomination of the revoked physical currency. A smart contract may refer to a computer protocol intended to digitally facilitate, verify, and/or enforce the negotiation or performance of a contract. Smart contracts may allow the performance of credible transactions without third parties. The smart contract may be in the form of chaincode on the blockchain 306.

At S340, the central entity 302 transforms the value of the physical currency to digital currency on the blockchain 306. The central entity 302 may generate the digital currency on the blockchain 306 by generating a record on the blockchain 306. In some embodiments, generating the digital currency may involve use of a certificate to validate permission to generate new currency. Alternatively, or additionally, generating the digital currency may involve solving a mathematical problem with a cryptographic hash function.

At S350, the blockchain 306 makes the digital fiat currency available at the central entity's blockchain account 304. The digital fiat currency may be recorded to the blockchain 306 in association with an identifier of the central entity's blockchain account 304, such as the public key of the central entity, which can be recorded to the transaction data in the blockchain to indicate that the digital fiat currency has been assigned to the central entity 302.

In some embodiments, the stored serial number may be used to prevent use of counterfeited physical currency. After replacing a physical currency with a digital currency (e.g., based on a first request), the central entity computer may receive a second request for digital currency. The second request includes a serial number and a denomination of a second physical currency. The second physical currency is a counterfeit of the physical currency earlier destroyed: the serial number and the denomination of the second physical currency are the same as the serial number and the denomination of the first physical currency. The central entity computer determines that the digital currency corresponding to the serial number and denomination is already recorded on the blockchain. For example, the central entity computer may query the blockchain and/or a world state database (as described below with respect to FIG. 7A) to check whether a particular serial number has already been used in a generated digital currency. Based on determining that the serial number has already been used, the central entity computer refrains from generating a second digital currency based on the second request.

Similarly, by recording the serial number of the physical currency removed from circulation, use of counterfeited notes can be prevented. For example, if a bank note, supposed to be destroyed, reappears at a later transaction, then the central entity may check the blockchain in order to identify the name of the bank that initially requested the bank note to be destroyed based on the denomination and serial number.

Figure 4:
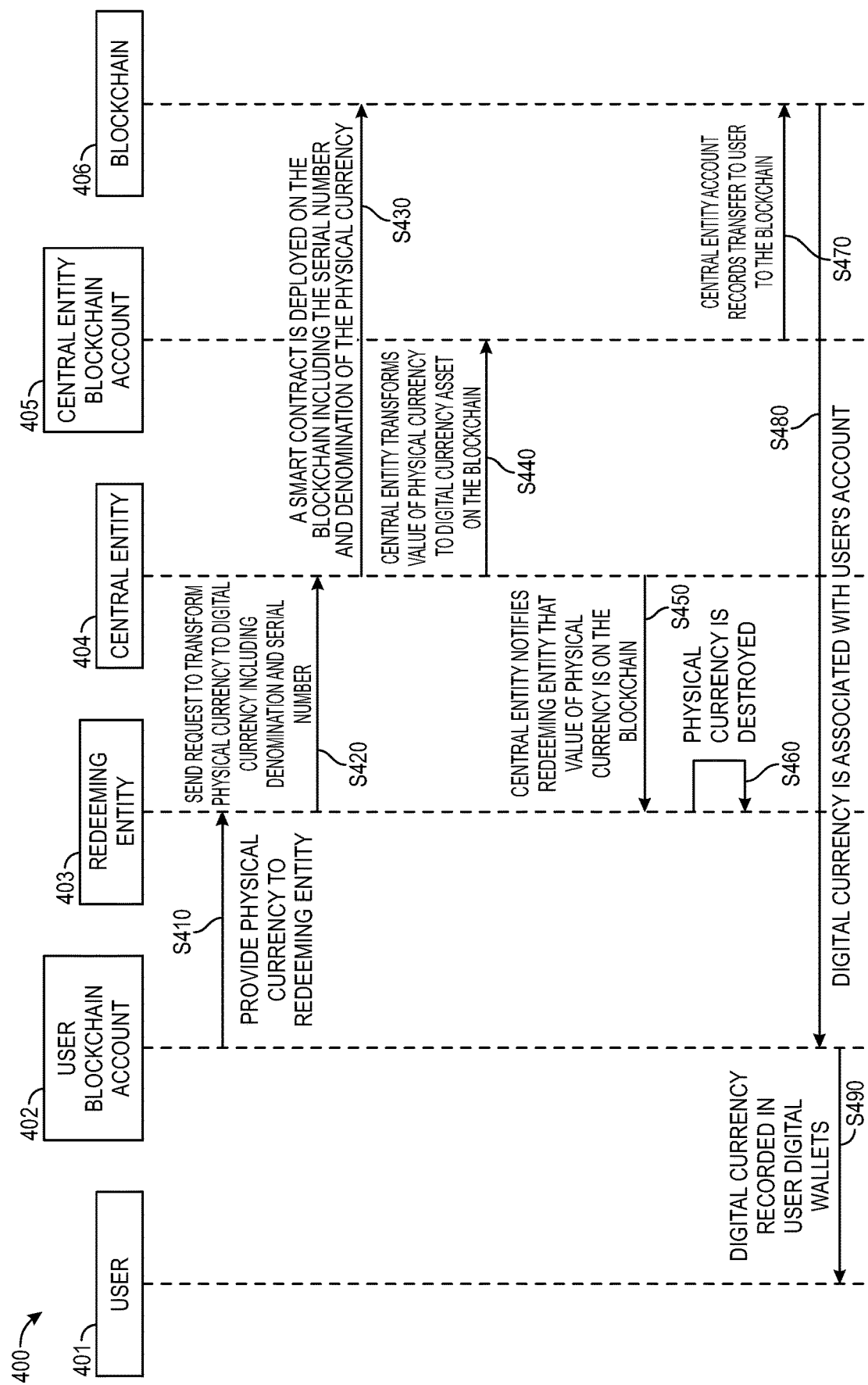
FIG. 4 illustrates an example of a flowchart of steps illustrating an entity exchanging cash banknotes for digital fiat currency, according to various embodiments.

FIG. 4 illustrates a flowchart illustrating an example of a method 400 for user a exchanging physical currency for digital fiat currency, according to various embodiments. The method 400 may be performed by a central entity 404 (which may be substantially similar to the central entity 104 of FIG. 1), a redeeming entity 403 (which may be substantially similar to the redeeming entity 102 of FIG. 1), and a user 401 (which may be substantially similar to user 108 of FIG. 1) with a corresponding blockchain account 402, via a blockchain 406 (which may be substantially similar to the blockchain 112 of FIG. 1).

At S410, the user 401 provides physical currency (e.g., one or more cash notes) to redeeming entity 403 (e.g., an ATM or bank location). As an example, user 401 may go to an ATM and insert a $100 bill. The user 401 may then interact with a button selecting an option to redeem the physical currency for digital fiat currency. As another example, the user 401 may go into the bank, hand a teller a $100 bill, and verbally indicate to the teller that she wishes to redeem the $100 bill for digital fiat currency.

At S420, the redeeming entity 403 transmits, to the central entity 404, a request to transform the physical currency to digital fiat currency. The request may include a denomination of the physical currency (e.g., $100) and a serial number of the physical currency (e.g., a serial number of a particular bill). The redeeming entity 403 may, for example, transmit the request by an electronic message over a network, and/or via a push to an Application Programming Interface (API) exposed by the central entity 404.

At S430, the central entity 404 deploys a smart contract on the blockchain including the serial number and the denomination of the physical currency. The central entity 404 may deploy the smart contract on the blockchain in a similar fashion as described above with respect to S330 of FIG. 3. The smart contract may include a serial number of the physical currency. The serial number may be a combination of letters and numbers printed on the physical currency and used for counterfeit prevention. By including the serial number in the digital currency record, similar functions can be provided for the digital currency. The smart contract may include a denomination of the physical currency (e.g. $1, $100, etc., as denoted on the face of the physical currency redeemed at S410).

At S440, the central entity 404 transforms the value of the banknotes to digital fiat currency on the blockchain. The smart contract may be finalized to digital currency held in the central entity blockchain account 405 once a set of validating entities (not shown in FIG. 4; see validating entities 110A-110C of FIG. 1) have validated and recorded the transaction on the blockchain. Transforming the value of the banknotes to digital fiat currency on the blockchain may further include recording the address of the central entity blockchain account on the blockchain record of the transaction.

At S450, the central entity 404 notifies the redeeming entity 403 that the digital fiat currency corresponding to the physical currency is on the blockchain. The central entity 404 may transmit a notification to the redeeming entity 403. The notification may include information such as the transaction amount, serial number, originating address, and destination address.

At S460, the redeeming entity 403 destroys the physical currency. Alternatively, upon receiving this confirmation, the redeeming entity 403 may send the physical currency to the central entity 404, or an agent of the central entity 404, to destroy the physical currency. In some embodiments, the redeeming entity 403 may store physical currency earmarked for destruction prior to destroying or sending out for destruction in batches. In some embodiments, the physical currency may be removed from circulation without destroying it (e.g., by locking it away in a vault).

At S470, the central entity blockchain account 405 records a transfer to the user 401 to the blockchain. The transfer transaction may be recorded to the blockchain, including such information as the address of the digital wallet of the user 401, the public key of the digital wallet of the user 401, the transfer amount, and/or a signature generated using the private key of the central entity 404.

At S480, the digital currency is associated with the user's account. Data may be stored to the user 401 blockchain account 402, indicating that the digital currency is now held by the user 401. Such information may include transaction amount, transaction identifier, and the serial number. Thus, the method may include associating the digital currency with a digital wallet using a private key stored to the digital wallet. This may ensure that the digital currency is securely stored in the wallet, and only can be transferred by the user 401 holding the private key.

At S490, the digital currency is recorded to the account of the user 401 in the mobile wallet of the user 401. A mobile wallet, stored on a user device, may track an amount of digital currency associated with the mobile wallet. The mobile wallet may increment the amount previously stored, so that the user 401 can have an accurate view of her current digital fiat currency holdings. In some embodiments, the digital currency is transformed into value on the entity's mobile wallet secured with entity's private key.

Once issued, an entity such as a user or bank may transfer the digital currency from wallet to wallet or store the digital currency on a smart card and transfer the smart card to another entity. In some embodiments, the entity may be able to divide the digital currency up to smallest components (e.g. similar to US penny). Each smaller amount may be associated with a private key and the entity's mobile wallet may store the private keys. The entity may transfer smaller amounts than the initial digital currency obtained by exchanging the cash banknotes to other entities. A first entity may transfer value to a second entity by simply sharing the private key associated with that value/amount with the second entity.

Figure 5:
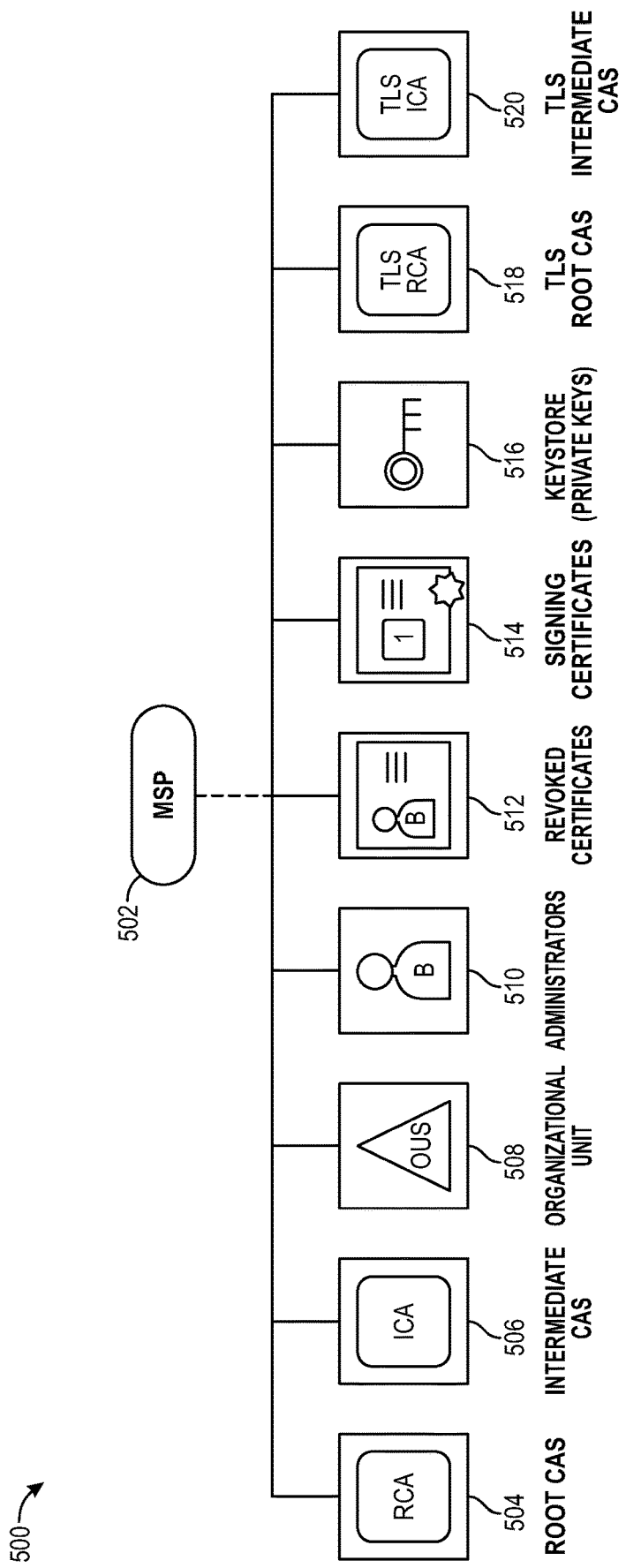
FIG. 5 illustrates example components for managing permissions on the blockchain, according to various embodiments.

FIG. 5 illustrates example components 500 for managing permissions on the blockchain, according to various embodiments. As described above with respect to FIG. 1, the transaction processing network 106 may act as a certificate authority and membership service provider to control permissions to perform actions on the blockchain, which may be implemented using a certificate scheme as described with respect to FIG. 5. The MSP 502 may be the transaction processing network 106. Alternatively, or additionally, local MSPs 502 may be assigned within organizations such as banks to control permissions of members of the organization.

The MSP 502 may identify specific roles an entity can play in the digital fiat currency infrastructure. For example (with reference to the entities shown in FIG. 1), the central entity 104 may be granted sole permission to create or destroy digital currency. The users 108 may be granted permission to transfer digital currency to one another. The validating entities 110A-110C may be granted permission to validate and record transactions to the blockchain. Based on such permissions, the MSP 502 sets the basis for defining access privileges. Such access privileges may be in the context of a network and channel (e.g. channel admins, readers, writers, etc.). In addition, the MSP 502 may allow for the identification of a list of identities that have been revoked. The MSP 502 may manage a plurality of folders for storing certificates and keys to control permissions on the blockchain, as discussed below.

The MSP 502 may manage the network identities of all member organizations (e.g., a particular bank) and their users (e.g., a particular sector or employee of the bank). The MSP 502 may establish permissioned identity for every user to enable Access Control List (ACL)-based control over network activity. This can be used to guarantee that every transaction is ultimately traceable to a registered user.

The Root CAs folder 504 may contain a list of self-signed certificates (e.g. X.509 certificates) of entities trusted by the MSP 502. The MSP 502 may issue a root certificate (root-Cert) to each member (organization or individual) that is authorized to join the network. In some embodiments, there must be at least one Root CA certificate in the MSP folder. The Root CAs folder 504 may be the most important folder because it identifies the CAs from which all other certificates must be derived to be considered members of the corresponding organization.

MSP 502 may also issue an enrollment certificate (eCert) to each member component, server-side applications, and occasionally users. Each enrolled user may also be granted an allocation of transaction certificates (tCert). Each tCert authorizes one network transaction. The Certificate Authority (CA) issues the certificates for organizations to authenticate to the network.

The intermediate CAs folder 506 may contain a list of certificates (e.g. X.509 certificates) of the Intermediate CAs trusted by the organization. According to various embodiments, each certificate must be signed by one of the Root CAs in the MSP or by an Intermediate CA whose issuing CA chain ultimately leads back to a trusted Root CA. An intermediate CA may represent a different subdivision of the organization (like ORG1-MANUFACTURING and ORG1-DISTRIBUTION do for ORG1), or the organization itself (as may be the case if a commercial CA is leveraged for the organization's identity management). In the latter case, intermediate CAs may be used to represent organization subdivisions. According to some embodiments, a functioning network may not have an Intermediate CA, in which case this folder may be empty. Like the Root CA folder, intermediate CA folder defines the CAs from which certificates must be issued to be considered members of the organization.

Organizational Units (OUs) 508 may be listed in a file (e.g., a $FABRIC_CFG_PATH/msp/config.yaml file) and may include members considered to be part of the organization represented by the MSP. The list of organizational units 508 may allow a CA to restrict the members of an organization to the ones holding an identity (e.g. signed by one of the MSP-designated CAs) with a specific OU 508 in it. According to various embodiments, specifying OUs 508 may be optional. If no OUs 508 are listed, all the identities, as identified by the Root CA and Intermediate CA folders, may be considered members of the organization.

The administrators folder 510 may contain a list of identities that define the actors who have the role of administrators for an organization. For the standard MSP 502 type, there should be one or more certificates (e.g. X.509 certificates) in the list. However, an actor with the role of an administrator may not necessarily administer particular resources. The actual power a given identity has with respect to administering the system may be determined by the policies that manage system resources. For example, a channel policy might specify that ORG1-MANUFACTURING administrators have the rights to add new organizations to the channel, whereas the ORG1-DISTRIBUTION administrators have no such rights. Even though a certificate has a ROLE attribute (specifying, for example, that an actor is an admin), this refers to the actor's role within the organization rather than on the blockchain network. This is similar to the purpose of the organizational unit attribute, which—if it has been defined—refers to an actor's place in the organization. The ROLE attribute may be used to confer administrative rights at the channel level if the policy for that channel has been written to allow any administrator from an organization (or certain organizations) permission to perform certain channel functions (such as instantiating chaincode). Accordingly, an organizational role may confer a network role.

The Revoked Certificates folder 512 may include identifying information about the identity of an actor that has been revoked. The MSP 502 may refrain from storing the identity of the actor itself. For certificate-based identities, these identifiers are pairs of strings known as Subject Key Identifier (SKI) and Authority Access Identifier (AKI), and are checked whenever the certificate is being used to make sure the certificate has not been revoked. This list may be the same as a CA's Certificate Revocation List (CRL), but it may also relate to revocation of membership from the organization. As a result, the administrator of an MSP, local or channel, may quickly revoke an actor or node from an organization by advertising the updated CRL of the CA. This "list of lists" may be optional and may only become populated as certificates are revoked.

The signing certificates folder 514 may contain the identity of the node, i.e., cryptographic material that, in combination to the content of KeyStore, may allow the node to authenticate itself in the messages that is sends to other participants of its channels and network. For certificate-based identities, the folder contains the certificate (e.g. an X.509 certificate). This is the certificate a peer places in a transaction proposal response, for example, to indicate that the peer has endorsed it—which may subsequently be checked against the resulting transaction's endorsement policy at validation time.

The keystore folder 516 may store cryptographic keys. In some embodiments, the keystore folder stores private keys. The keystore folder may be defined for the local MSP of a peer or orderer node (or in an client's local MSP), and contains the node's signing key. This key matches cryptographically the node's identity included in Node Identity folder and is used to sign data—for example, to sign a transaction proposal response. This folder may be mandatory for local MSPs, and must contain exactly one private key. Access to this folder may be limited only to the identities of users who have administrative responsibility on the peer. Configuration of a channel MSPs may not include this folder, as channel MSPs solely aim to offer identity validation functionalities and not signing abilities.

The Transport Layer Security (TLS) Root CA folder 518 may contain a list of self-signed certificates (e.g., X.509 certificates) of the Root CAs trusted by this organization for TLS communications. An example of a TLS communication may be when a peer needs to connect to another node (such as an orderer in the Hyperledger embodiment) so that it may receive ledger updates. MSP TLS information relates to the nodes inside the network—the peers and the orderers, in other words, rather than the applications and administrations that consume the network. In some embodiments, there must be at least one TLS Root CA X.509 certificate in this folder.

The TLS Intermediate CA folder 520 may contain a list intermediate CA certificates CAs trusted by the organization represented by this MSP for TLS communications. This folder is specifically useful when commercial CAs are used for TLS certificates of an organization. Similar to membership intermediate CAs, specifying intermediate TLS CAs may be optional.

This certificate-based control over network membership and actions enables members to restrict access to private and confidential channels, applications, and data, by specific user identities. According to various embodiments discussed herein, the transaction processing network may provide the container and the central entity may be the only stakeholder allowed to provide the content. The content may then be transferred from one user account another. In other words, a digital fiat currency asset may be owned by a particular user at a particular point in time. The different stakeholders may be authenticated using their tCert.

The chaincode used to manage the digital fiat currency infrastructure may initialize and manage ledger states through transactions submitted by various applications. A chaincode may handle business logic agreed to by members of the network and, as such, the chaincode may be considered as a smart contract. The asset management application may bootstrap a non-validating peer and construct confidential transactions to deploy, invoke and query the asset management chaincode. In particular, in a scenario a first entity (e.g., Alice) may be the chaincode deployer. A second entity (e.g., Bob) may be the chaincode administrator and an asset owner. A third entity (e.g., Charlie) may be an asset owner. Alice may deploy and assign the administrator role to Bob. Bob may assign the asset "Picasso" to Charlie, and Charlie may transfer the ownership of Picasso to Dave.

Figure 6:
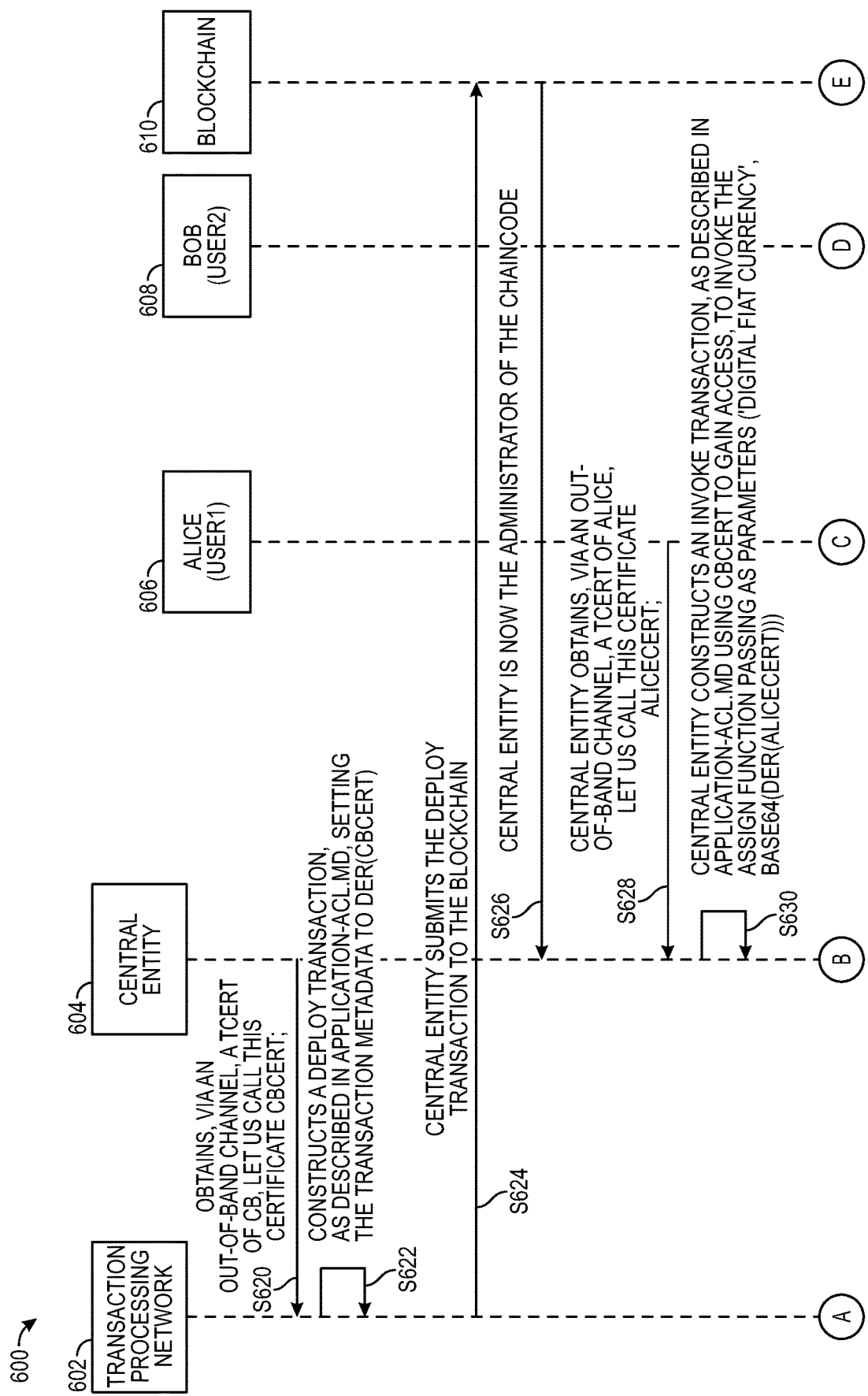
FIG. 6 illustrates an example of a flowchart of steps for asset management using digital fiat currency, according to various embodiments.
Figure 6:
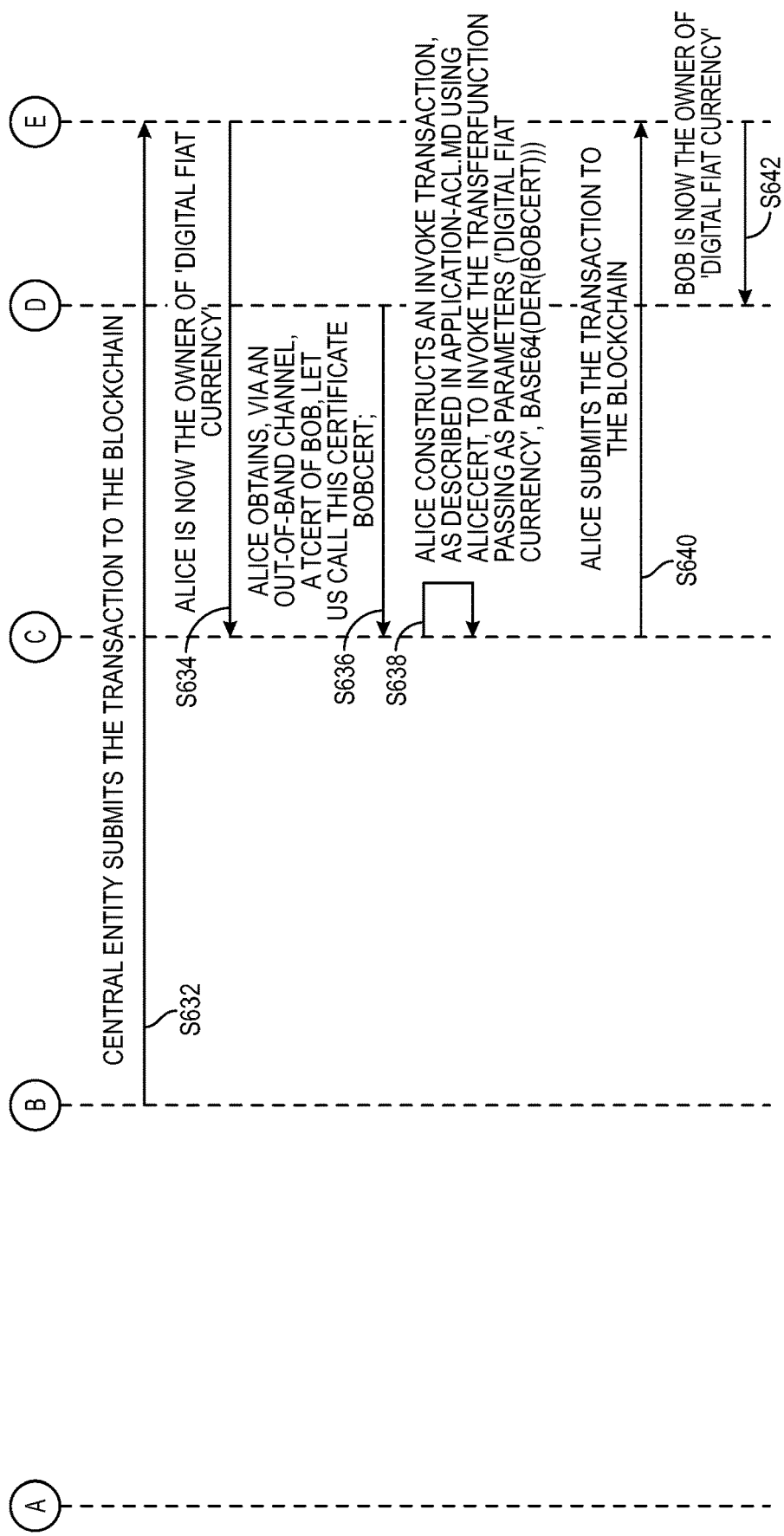

FIG. 6 is flowchart illustrating an example method 600 for asset management using digital fiat currency when a first entity sends a digital fiat currency asset to a second entity. The method 600 may be performed by a transaction processing network 602 (which may be substantially similar to the transaction processing network 106 of FIG. 1), a central entity 604 (which may be substantially similar to the central entity 104 of FIG. 1), and two users, Alice 606 and Bob 608 (which may be substantially similar to the users 108 of FIG. 1), via a blockchain 610 (which may be substantially similar to the blockchain 112 of FIG. 1).

At S620, the transaction processing network 602 obtains, via an out-of-band channel, a transaction certificate (tCert) from the central entity 604 ("CBCert"). The transaction processing network 602 may assess and validate the tCert. The transaction processing network 602 may determine that the central entity 604 has permission to initiate a transaction on the blockchain 610.

At S622, the transaction processing network 602 generates a deploy transaction construct. The deploy transaction construct may include the certificate from the CBCert, or the binary form thereof, as metadata.

At S624, the transaction processing network 602 submits the deploy transaction to the blockchain. The transaction processing network 602 may store transaction data to the blockchain, which may include information specifying that the central entity has administration rights, based on validating the tCert at S620.

At S626, the central entity 604 becomes the administrator of the chaincode. Based on the deployed transaction information, which may include the tCert, CBCert, and other metadata, the central entity 604 may assume administration rights to validate certificates for other entities, such as user Alice 606.

At S628, the central entity 604 may obtain a tCert of the first user, Alice 606 ("AliceCert"). The central entity 604 may obtain the AliceCert via an out-of-band channel. For example, Alice 606 may initiate a transfer of digital fiat currency. Alice 606 may, via a user device, transmit information to initiate the transfer, including but not limited to the user certificate AliceCert, Alice's public key, and/or an address associated with a digital wallet held by Alice 606.

At S630, the central entity 604 generates an invoke transaction construct. The central entity 604 may generate the invoke transaction construct using its certificate, CBCert, to gain access, to invoke an assign function to assign the digital currency to Alice 606. In some embodiments, the assign function may pass the parameters ("Digital Fiat currency", Base64(DER(AliceCert))), indicating that digital fiat currency is to be assigned to Alice 606 using her certificate, AliceCert.

At S632, the central entity 604 may then submit the transaction to the blockchain 610. The central entity 604 may store transaction data to a block on the blockchain which may include the public key and/or address of the central entity 604 (e.g., in a "from" field) and the public key and/or address of Alice 606 (e.g., in a "to" field). The transaction data may further include an amount, a currency type, a serial number, and certificate information (e.g., CBCert, AliceCert, and/or tCert).

At S634, Alice 606 becomes the owner of the digital fiat currency identified in the central entity's invoke transaction construct. One or more validating entities may validate the transaction on the blockchain, at which point Alice 606 may be officially considered the new owner of the digital fiat currency.

At S636, Alice 606 may obtain a tCert of a second user, Bob ("BobCert"). Alice 606 may obtain BobCert in association with initiating a transfer of digital currency from Alice 606 to Bob 608. For example, Bob 608 may, via a user device, transmit information to Alice 606 to initiate the transfer, including but not limited to the user certificate BobCert and an address or public key associated with a digital wallet held by Bob 608. In some embodiments, the address is a modified form of the public key.

At S638, Alice 606 may construct an invoke transaction. Alice 606 may construct the invoke transaction using AliceCert to invoke a transfer function. The transfer function may pass as parameters ("Digital Fiat currency', Base64 (DER(BobCert))).

At S640, Alice 606 may then submit the transaction to the blockchain 610. Alice may transmit information to the blockchain such as the transaction amount and Bob's digital wallet address. The information may further be signed using Alice's private key, which may be retrieved from a secure element of Alice's user device and/or a chip on a payment card of Alice. The information may further include Alice's public key and/or digital wallet address. In some embodiments, a user may initiate a transaction using a user interface as illustrated and described below with respect to FIG. 8.

At S642, Bob 608 becomes the owner of the digital fiat currency identified in the invoke transaction construct. Bob may become the owner of the digital fiat currency subject to the transaction being validated/recorded by a plurality of recording entities on the blockchain. The validating entities may further confirm the public keys of Bob and/or Alice to validate the transaction.

After S642, Bob 608 may transfer the digital fiat currency to another entity, and so forth, such that the digital currency asset is passed among multiple entities. For example, Alice 606 (or, alternatively, or additionally, the transaction processing network 602) may obtain, via an out-of-band channel, a tCert of Bob 608 ("BobCert"). Alice 606 may generate a deploy transaction construct including the certificate from the tCert of Bob 608 (BobCert), or the binary form thereof, as the metadata. Alice 606 may then submit the deploy transaction to the blockchain 610. The Bob 608 becomes the administrator of the chaincode. At a later time, Bob 608 may obtain a tCert of another user, Charlie ("CharlieCert"). Bob 608 may generate an invoke transaction construct using his own tCert (e.g. BobCert) to gain access, to invoke the assign function passing as parameters ("Digital Fiat currency', Base64(DER(CharlieCert))). Bob 608 may then submit the transaction to the blockchain 610. This way, Charlie becomes the owner of the digital fiat currency identified in the invoke transaction construct of Bob 608. At a later time, Charlie may obtain a tCert of another user, Dave ("DaveCert"). Charlie may construct an invoke transaction using his tCert (CharlieCert) to invoke the transfer function passing as parameters ("Digital Fiat currency', Base64(DER(DaveCert))). Charlie may then submit the transaction to the blockchain 610. This way, Dave becomes the owner of the digital fiat currency identified in the invoke transaction construct of Charlie.

Figure 7A:
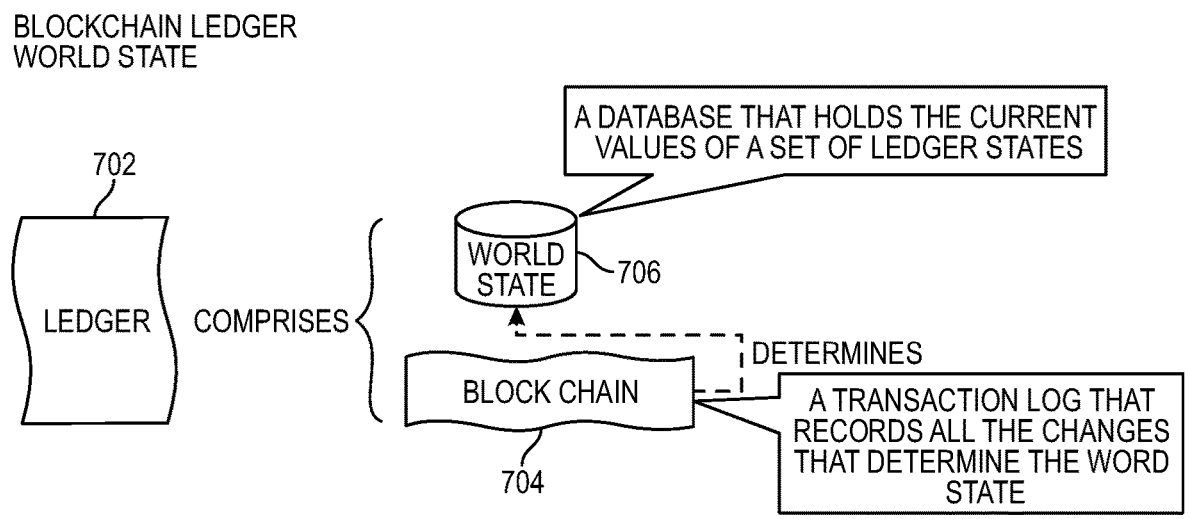
FIGS. 7A-7C illustrate examples of data and metadata used to record digital fiat currency transactions on the blockchain, according to various embodiments.
Figure 7B:
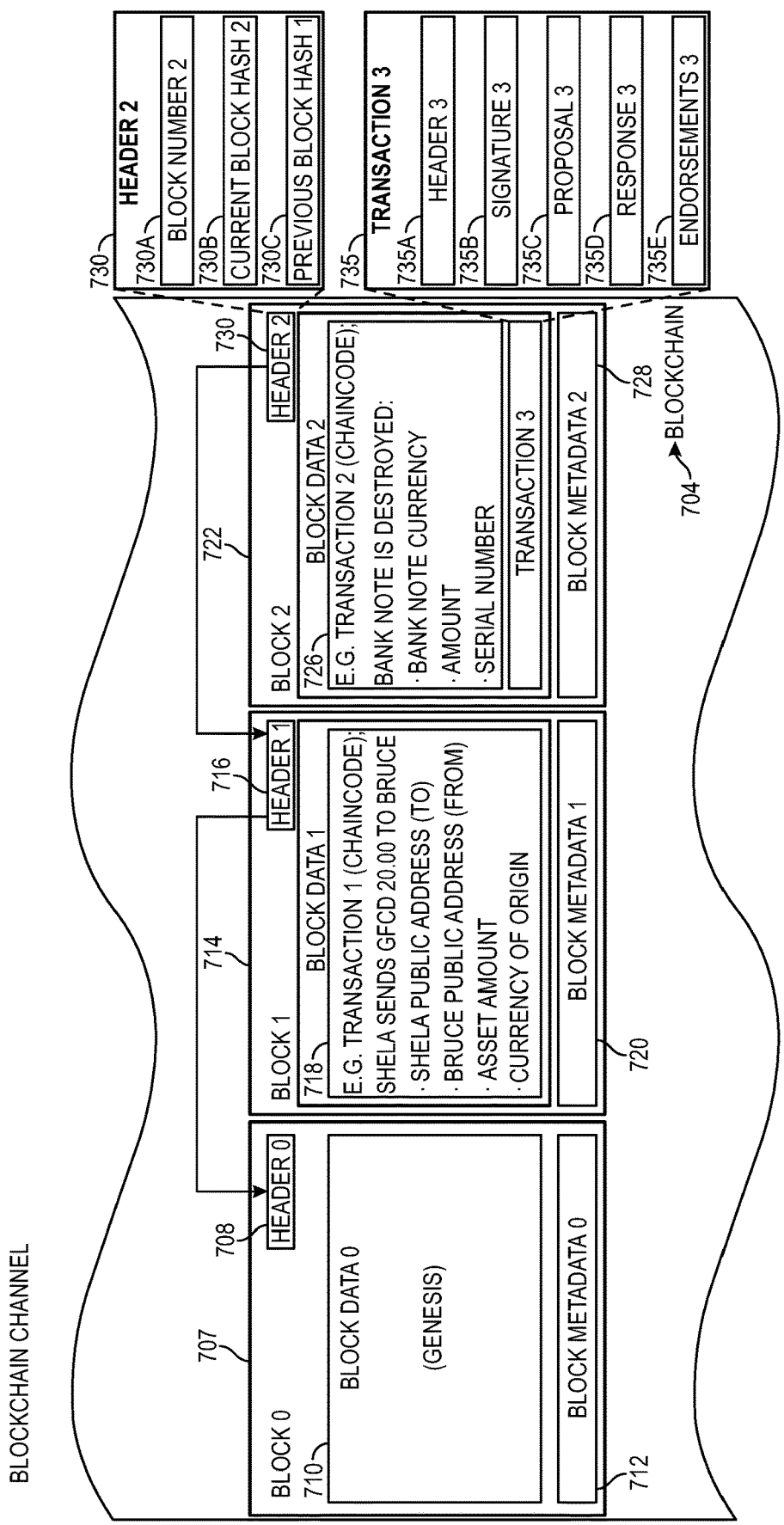
Figure 7C:
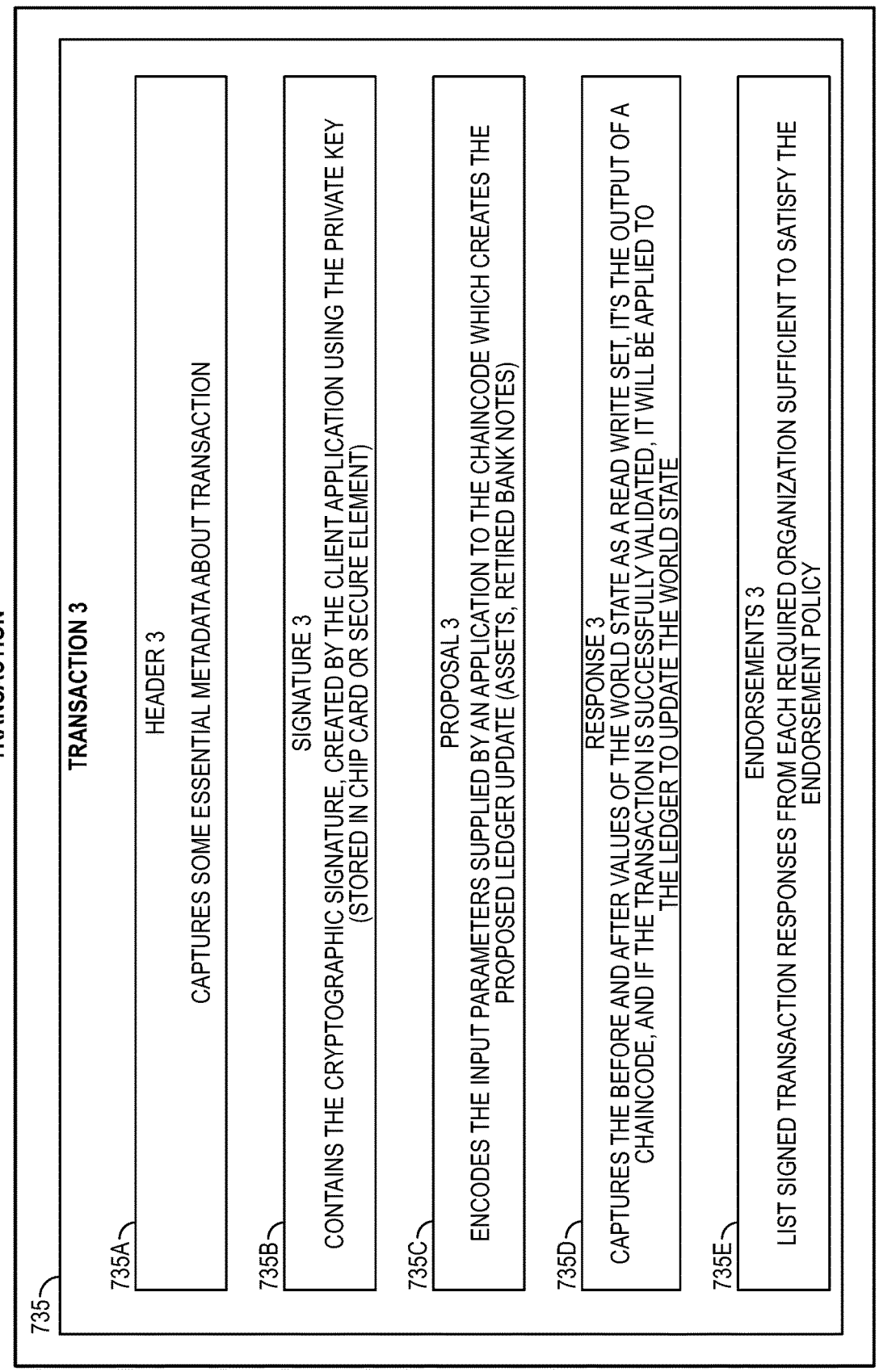

FIGS. 7A-7C illustrate examples of data and metadata used to record digital fiat currency transactions on the blockchain, according to various embodiments. FIG. 7A illustrates a ledger including a blockchain. FIGS. 7B and 7C illustrate data which may be stored on the blockchain.

FIG. 7A illustrates a ledger 702 according to some embodiments. The ledger 702 includes a blockchain 704 and a world state database 706. In some embodiments, the ledger 702 is a distributed ledger for storing data related to digital currency transactions. The ledger 702 may be stored by one or more blockchain nodes, as described above with respect to FIG. 1.

In some embodiments, the world state database 706 is a database that holds the current value of a set of ledger states. For example, the world state database 706 may specify the current holder of each unit of digital currency (e.g., Alice has $400 in digital currency, Bob has $300 in digital currency, bank X has $10,0000,000 in digital fiat currency, and so forth).

In some embodiments, the blockchain 704 is a transaction log that records changes that determine the world state. The blockchain 704 may be substantially similar to the blockchain 112 described above with respect to FIG. 1. The blockchain 704 may store data as described below with respect to FIGS. 7B and 7C.

FIG. 7B illustrates data on the blockchain 704. The blockchain 704 includes a plurality of blocks (e.g., Block 0 707, Block 1 714, and Block 2 722; there may be up to thousands or millions of blocks in the blockchain).

Block 0 707 is the first block in the chain, or genesis block. Block 0 707 forms the foundation of the blockchain. For the first block in the blockchain, the block data 710 and block metadata 712 may be empty. Block 0 707 includes a header 708. The header 708 of the genesis block may contain data used to link the Block 0 707 to other blocks in the chain, such as letters, numbers, and so forth. This data may be stored in hashed and/or unhashed form.

Block 1 714 is the second block in the chain. Block 1 714 includes block data 1 718. Block data 1 718 stores data for a set of transactions (e.g., chaincode). In FIG. 7B, information about one transaction is shown—transaction 1, wherein Sheila sends $20 in digital currency to Bruce. Data about transaction 1 is stored in block 1, including a public address of Sheila (e.g., a public key of Sheila's digital wallet), a public address of Bruce (e.g., a public key of Bruce's digital wallet), an asset amount (e.g., $20), and a currency of origin (e.g., US dollars). Although one transaction is shown in FIG. 7B for the sake of simplicity, a block may include hundreds or thousands of transactions.

Block 1 714 further includes block metadata 1 720. Block metadata 1 720 may, in some embodiments, include identifying information about the parties to the transactions recorded therein. Block 1 metadata 730 may include data about the information in the Block 1 714. Block 1 714 further includes Header 1 716. Header 1 716 may include a block number (e.g., Block 1). Header 1 may include a current block hash. The current block hash may be generated based on the contents of the current block, Block 1 714, in whole or in part. Header 1 716 may include a previous block hash generated by hashing the contents of the previous block and earlier blocks (e.g., a Merkle Root), Block 0 707, in whole or in part. In some cases, a nonce value is appended to the hashed contents of the previous block and/or the current block. The hashed contents with the nonce value may be hashed again to generate an updated hashed value. This updated hashed value may be stored to link the blocks in an even more secure manner.

Block 2 722 is the third block in the chain. Block 2 722 includes Block Data 2 726. Data for two transactions is shown for simplicity, although data for many transactions may be stored to Block 2 722. As shown in FIG. 7B, the Block Data 2 726 may include data for transaction 2 (e.g., chaincode), wherein a bank note is destroyed. The data for transaction 2 includes a bank note currency (e.g., US dollars), an amount (e.g., $50), and a serial number (e.g., a serial number for the physical currency destroyed).

Block 2 722 further includes block metadata 2 728. Block metadata 2 728 may be data about the data in the Block 2 722. Block 2 722 further includes Header 2 730. Header 2 730 may include a block number (e.g., Block 2). Header 2 730 may include a current block hash of Block 722 and a previous block hash of Block 1 714, which may be a Merkle Root. The current block hash and previous block hash may be similar to those described above with respect to Block 1 714.

Block Data 2 726 further includes data for Transaction 3 735. The data for transaction 3 735 includes header 3 735A, signature 3 735B, proposal 3 735C, response 3 735D, and endorsements 3 735E. The data for Transaction 3 735 is shown in further detail in FIG. 7C.

Header 3 735A is associated with a specific transaction, and captures some essential metadata about the transaction (e.g., identifying information about the transaction such as party identities, certificates, or addresses). Signature 3 735B contains a cryptographic signature. The cryptographic signature may have been created using a private key of a particular digital wallet. The private key may be stored in a chip card or secure element.

Proposal 3 735C encodes input parameters supplied by an application to the chaincode, which creates a proposed ledger update. The input parameters may specify assets (e.g., units of digital currency) and/or retired bank notes (e.g., a notation indicating physical with a particular serial number has been retired/destroyed).

Response 3 735D captures the before and after values of the world state, which may be as a read-write set. Response 3 735D may be the output of a chaincode. If the transaction is successfully validated, then Response 3 735D will be applied to the ledger 702 to update the world state in the world state database 706.

Endorsements 3 735E is a list of signed transaction responses from each required validating entity. A particular subset of validating entities may be required, as is deemed sufficient to satisfy an endorsement policy. Such an endorsement policy may be preconfigured, for example, by the central entity and/or the transaction processing network.

Figure 8:
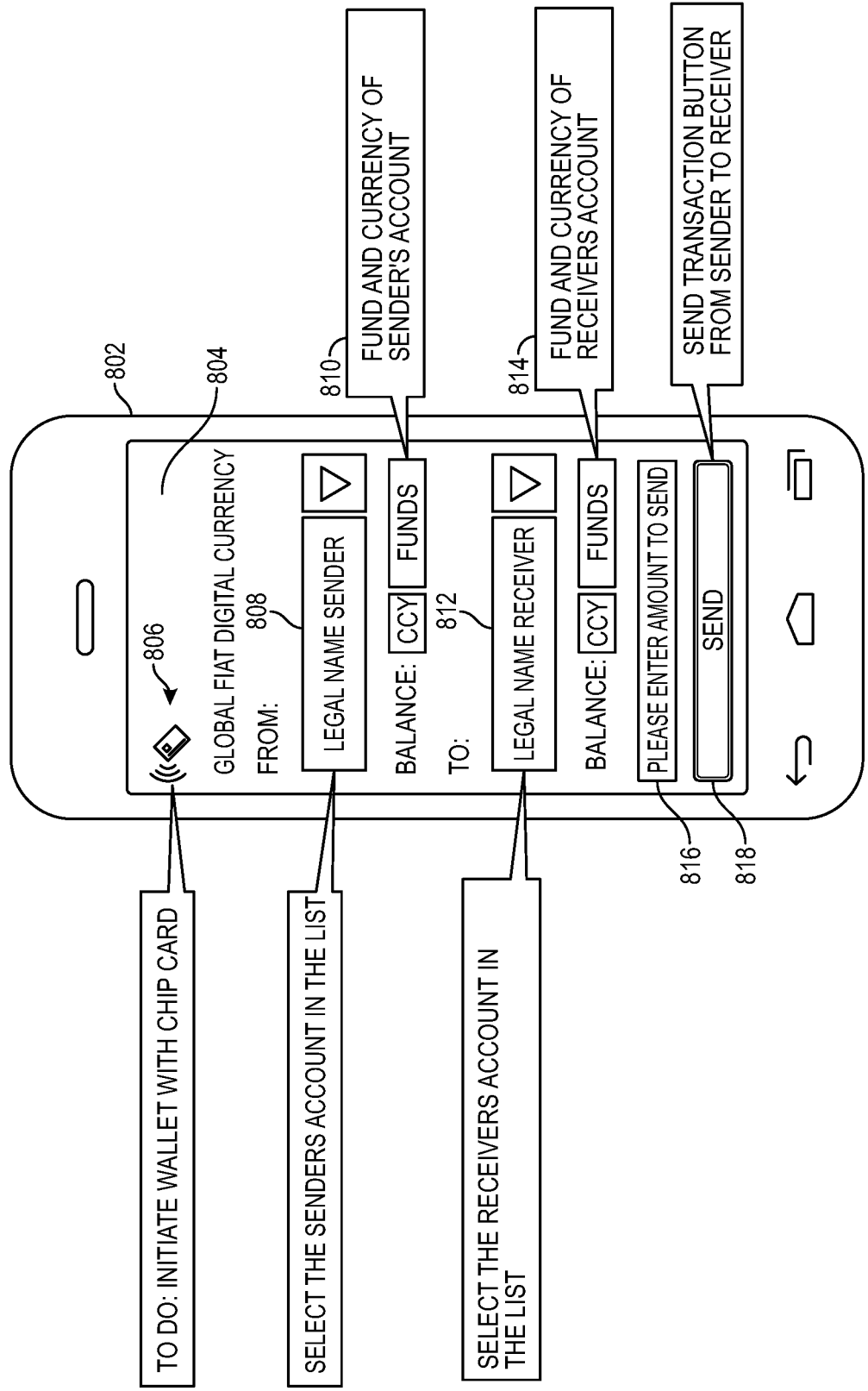
FIG. 8 illustrates an example interface for managing digital fiat currency, according to various embodiments.

FIG. 8 illustrates an example interface 804 for managing digital fiat currency, according to various embodiments. The interface 804 may be displayed on a user device 802, such as a smartphone, tablet, personal computer, or the like.

The interface 804 for managing digital fiat currency includes interface elements for accepting user input to send digital fiat currency. Interface 804 may include an indicator 806 that a digital wallet should be initiated with a chip card. This may apply in the case where the wallet private key is stored on the chip card.

The interface 804 for managing digital fiat currency further includes fields for the funds and currency of the sender's account 810. Upon receiving user selection of an available sender account, the interface 804 may display the available funds in the corresponding account, along with a currency (e.g., U.S. dollars, British pounds, and so forth). Similarly, the interface 804 may display available funds and currency in the selected receiver's account using fields for the funds and currency of the receiver's account 814.

The interface 804 for managing digital fiat currency further includes a field for an amount to send 816 and a send button 818. The field for an amount to send 816 may be a form field configured to accept numbers typed or otherwise provided by a user. For example, a user can type $150 into the field for an amount to send 816. Once the necessary information has been provided, the interface 804 can accept user interaction with the Send button 818. Upon detecting user interaction with the Send button 818, the transaction details can be sent to the back end to imitate the transaction on the blockchain.

In some embodiments, Ethereum may be used to implement various aspects described herein. Ethereum is a blockchain framework implementation. Ethereum is an open-source platform, and is described in detail in *Ethereum: A Secure Decentralised Generalised Transaction Ledger* by Dr. Gavin Wood and at ethereum.org.

Figure 9A:
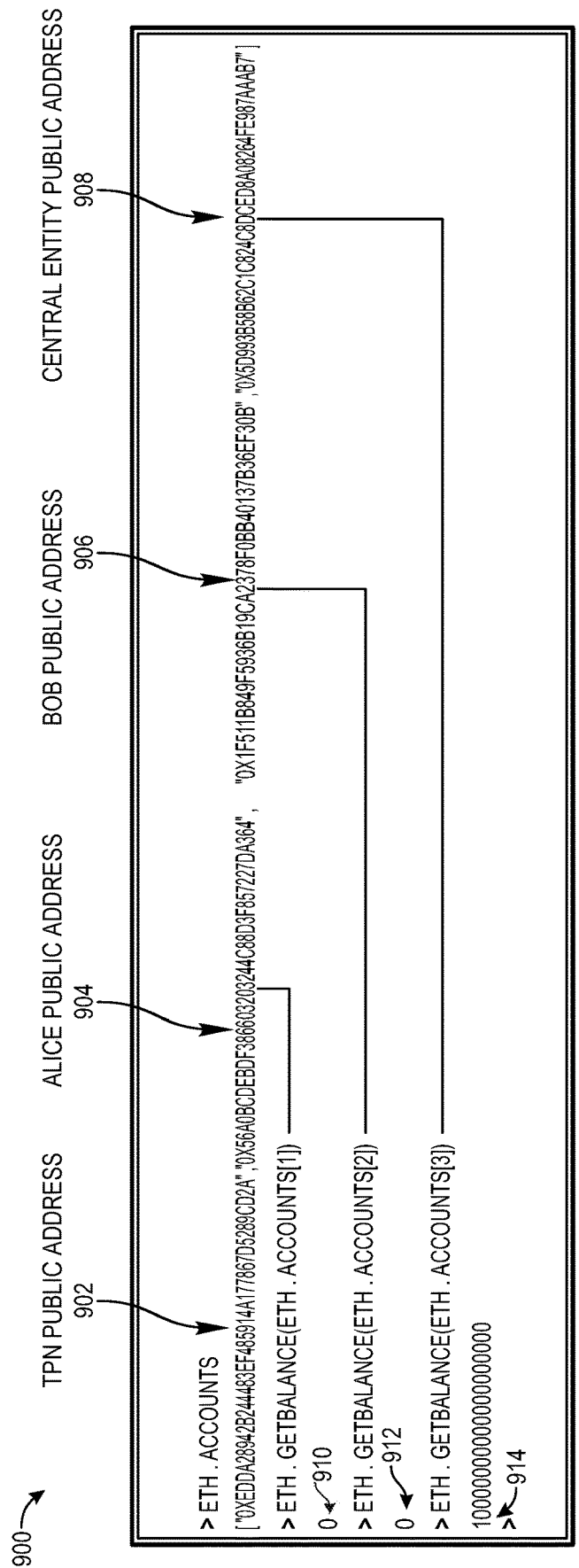
FIGS. 9A-9D illustrate example embodiments of implementing a digital fiat currency system using the Ethereum framework.

In some embodiments, digital fiat currency may be implemented using Ethereum as illustrated in FIGS. 9A-9D. In FIG. 9A, account information 900 is established for the entities in the system. Ethereum accounts are established for the transaction processing network, the central entity, and for users such as Alice and Bob. Each entity's Ethereum account is defined by a public address—transaction processing network (TPN) public address 902, Alice public address 904, Bob public address 906, and central entity public address 908.

The public addresses 902-908 are shown in the vector eth.accounts, and the balance of each element of the eth.accounts vector is shown below. Alice's account balance 910 is 0. Bob's account balance 912 is 0. The central entity's account balance 914 is 10 units of digital fiat currency.

Figure 9B:
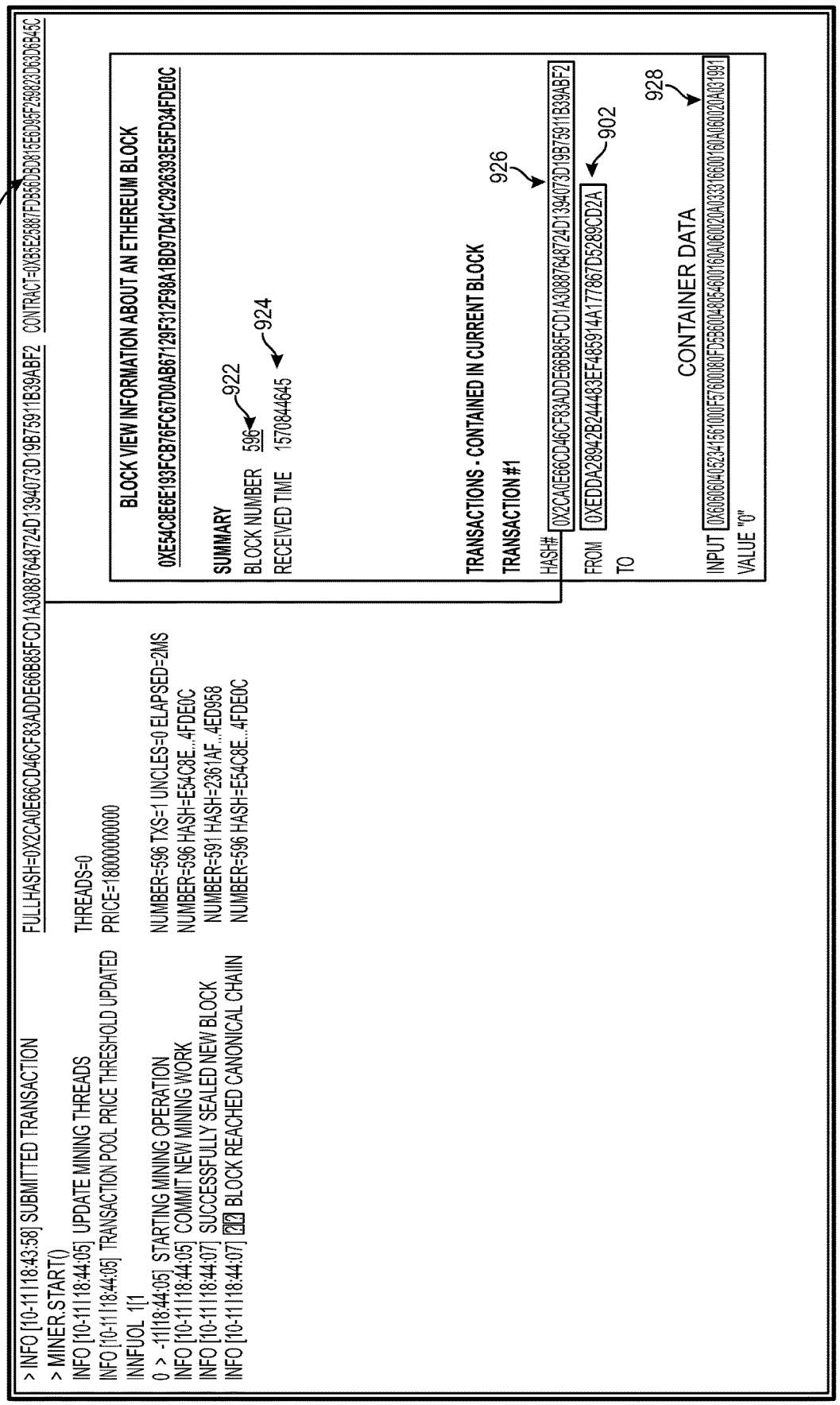

In FIG. 9B, a container is created on the blockchain. The container address 920 represents a contract for establishing new digital fiat currency on the blockchain. The container may be created by the transaction processing network for the central entity on the blockchain. An Ethereum block is generated, with parameters including a block number 922 and a received time 924.

FIG. 9B further illustrates transactions contained within the block. Transaction 1 is characterized by a hash value 926. Transaction 1 is from the transaction processing network, as indicated by the public address of the transaction processing network 902. Container data 928 is further provided as input to the current block.

Figure 9C:
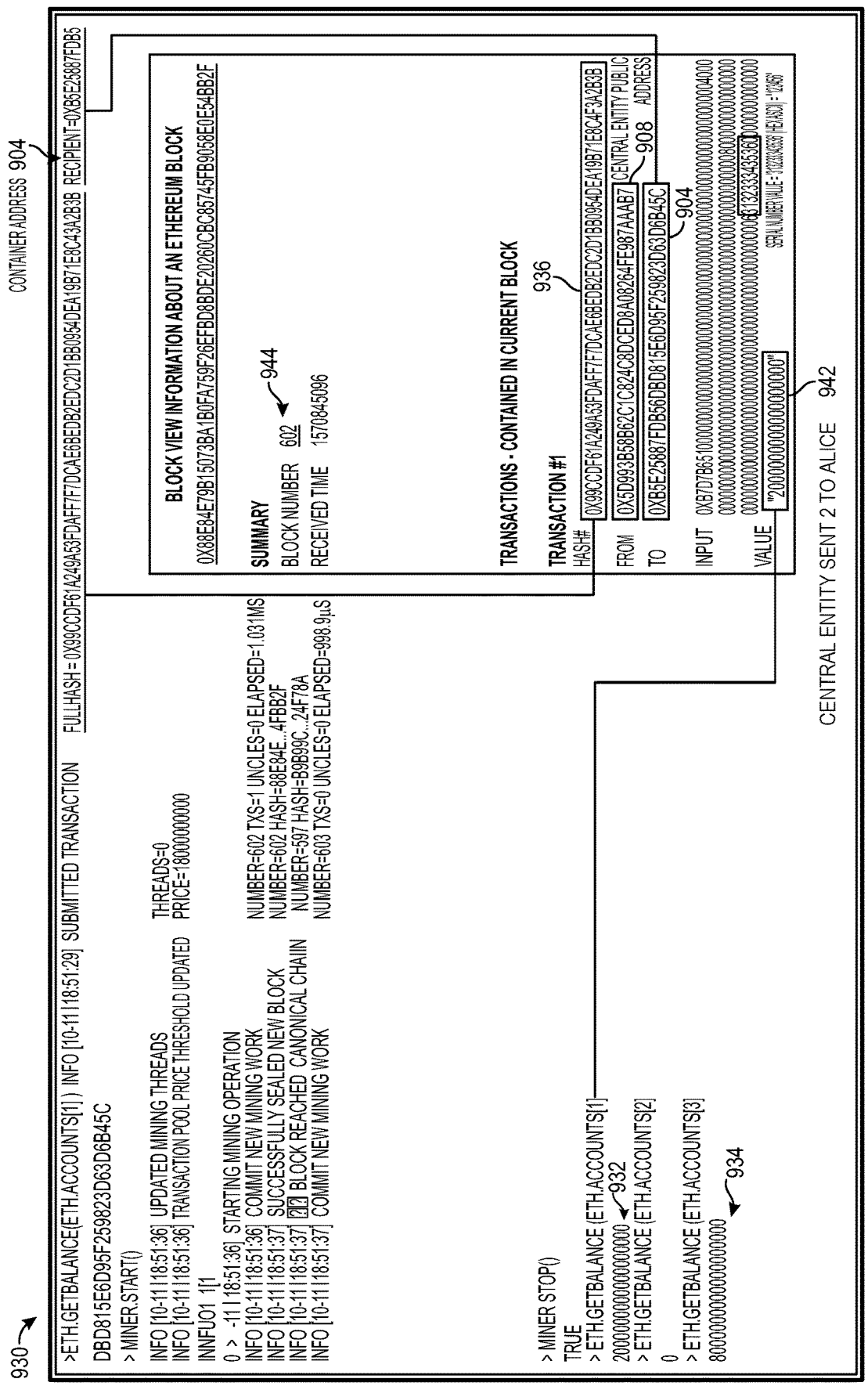

FIG. 9C illustrates a second transaction 930, where the central entity sends 2 digital fiat currency to Alice. The transaction is from the central entity to Alice, as indicated by Alice's public address 904 in the "to" field and the central entity's public address 908 in the "from" field. Alice's balance 932 is now 2 digital fiat currency, and the central entity's balance 934 is now 8 digital fiat currency. The transaction is recorded in association with hash 936 and is in block number 602 (944). The value of the transaction 942 is 200000000, indicating that the central entity sent 2 digital fiat currency to Alice. The transaction data further includes input 940, which includes the serial number of the physical currency originally converted to digital fiat currency.

Figure 9D:
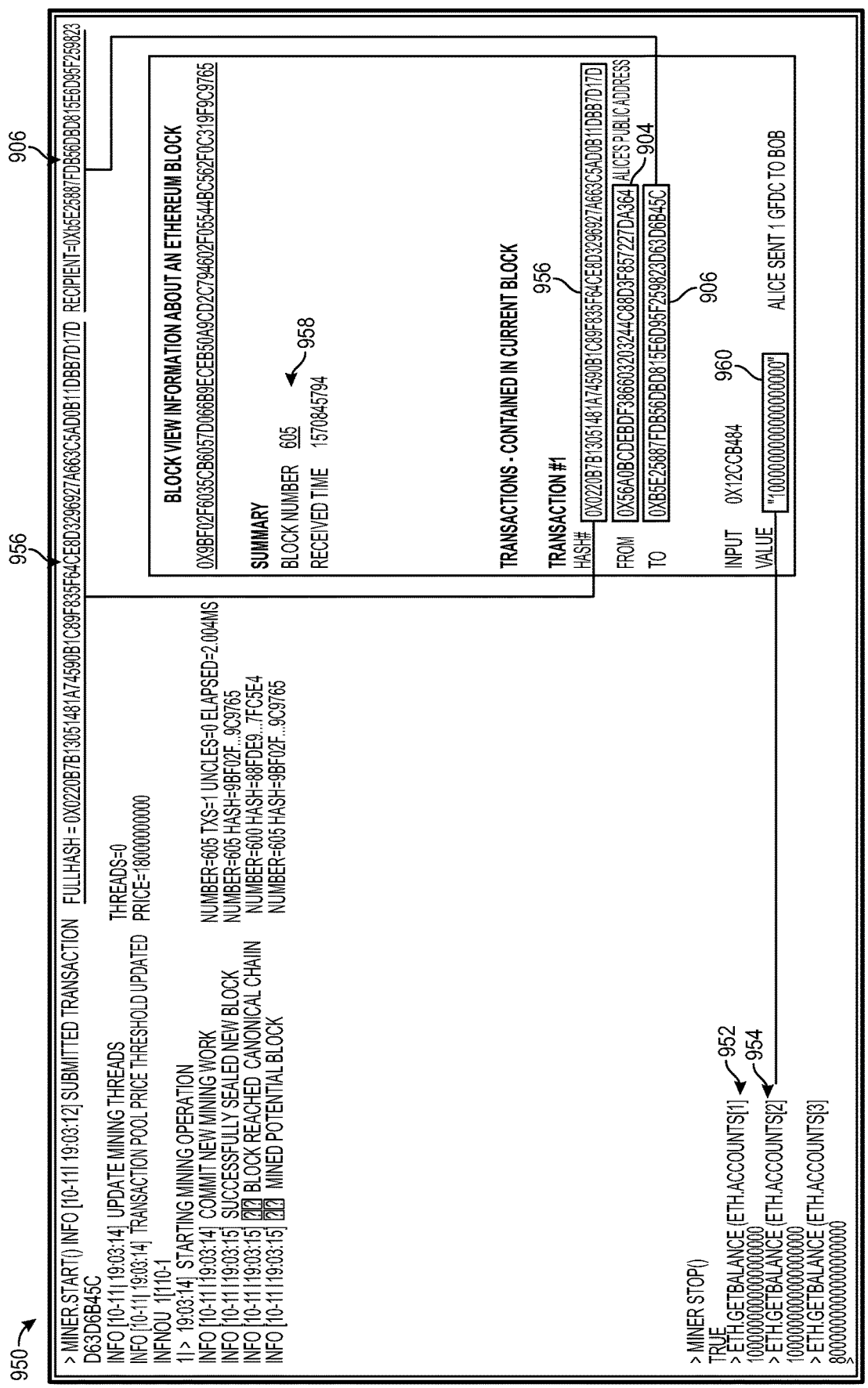

FIG. 9D illustrates a third transaction 950, where Alice sends 1 digital fiat currency to Bob. The transaction is from Alice to Bob, as indicated by Alice's public address 904 in the "from" field and Bob's public address 906 in the "to" field. Alice's balance 952 is now 1 digital fiat currency, and Bob's balance 954 is now 1 digital fiat currency. The transaction is recorded in association with hash 956, which identifies the transaction, and is in block number 605 (958). The value of the transaction 960 is 100000000, indicating that the Alice sent 1 digital fiat currency to Bob.

In some embodiments, Hyperledger Fabric may be used to implement various aspects described herein. Hyperledger Fabric is a blockchain framework implementation and one of the Hyperledger projects hosted by The Linux Foundation. Intended as a foundation for developing applications or solutions with a modular architecture, Hyperledger Fabric allows components, such as consensus and membership services, to be plug-and-play. Hyperledger Fabric leverages container technology to host smart contracts called chaincode that comprise the application logic of the system. Hyperledger Fabric is a permissioned network where all users and components have known identities. Hyperledger Fabric differs greatly from traditional blockchain implementations that promote anonymity and are forced to rely on cryptocurrencies and heavy compute obligations to validate transactions.

A network (e.g. Hyperledger Fabric) may include various components such as ledgers, smart contracts, peers, ordering services, channels and fabric certificate authorities. FIG. 5, described above, illustrates example membership service provider (MSP) structure and/or roles. For an identity to be verifiable, the identity must come from a trusted authority. A membership service provider (MSP) may act as the trusted authority in the Hyperledger Fabric. More specifically, an MSP may include a component that defines the rules that govern the valid identities for an organization. The default MSP implementation in Hyperledger Fabric uses X.509 certificates as identities adopting a traditional Public Key Infrastructure (PKI) hierarchical model. Other certificates may be used according to various embodiments.

In some embodiments, the blockchain may be implemented using pluggable consensus protocols. Examples of pluggable consensus protocols include Byzantine fault tolerant algorithms, as described in "Practical Byzantine Fault Tolerance" by Miguel Castro and Barbara Liskov, *Proceedings of the Third Symposium on Operating System Design and Implementation*, February 1999. Another example includes crash-fault tolerant algorithms, such as the Raft Consensus Algorithm, as described in "In Search of Understandable Consensus Algorithm" by Diego Ongaro and John Ousterhout, *Proceedings of USENIX ATC '14*, June 2014.

In some embodiments, the consensus mechanism is proof of stake. Proof of stake assigns validation rights to nodes in the blockchain based on factors such as an amount of digital currency held. Proof of stake is significantly more efficient than the more common proof of work algorithms, which require validating parties to perform computations which can take massive amounts of computing power. One example of a proof of stake algorithm, Ouroboros, is described in "Ouroboros: A provably Secure Proof-of-Stake Blockchain Protocol" by Aggelos Kiayias et. al, July 2019.

Embodiments may be implemented using zero-knowledge proof where one party (the prover) can prove to another party (the verifier) that they know a value x, without conveying any information apart from the fact that they know the value x.

Embodiments may be implemented using APIs. In some embodiments, the transaction processing network may expose an API that can be used to provide single point access to all participants. In some embodiments, APIs may be used to convert digital currency from a first currency type (e.g., dollars) to a second currency type (e.g., shillings). In this manner, digital fiat currency can provides a relatively simple and low-friction platform for currency conversion. In some embodiments, a source and target currency can be included in the transaction metadata, and currency exchange can be performed seamlessly with the transfer of the digital fiat currency.

Embodiments such as Hyperledger fabric can provide modular and configurable architecture, enabling innovation, versatility and optimization for a broad range of use cases.

In some embodiments, the records may be auditable, providing configurable transparency. Identities may be maintained by the transaction processing network. The identities may be used to govern certain levels of access control e.g. this user may read the ledger, but cannot exchange or transfer assets). Privacy can be provided, as embodiments such as Hyperledger fabric supports networks where privacy is a key operational requirement. Privacy can be controlled, for example, using channels. Anonymity may be provided in whole or in part. For example, the name of banks may be recorded on the blockchain in association with a transaction, but not the name of individual users. As another example, identifying information may be recorded in a limited fashion, e.g., based on transaction thresholds and central entity requirements. As a specific example, transactions for an amount less than $1,000 may remain anonymous, while transactions for $1,000 or more may be recorded with identifying information of the entities involved.

Embodiments provide multiple advantages. As noted above, conventional cryptocurrency systems have problems such as volatility and high power usage. Many of these issues can be solved using the private, permissioned network managed by a transaction processing network and central entity to speed up and manage the flow of currency.

Advantageously, varying consensus algorithms (e.g. byzantine or crash fault tolerant) may be implemented. As a result, use of permissioned networks can provide much higher transaction throughput rates and performance, as compared to the computationally expensive methods used in traditional public networks.

Physical currency can be from markets by mimicking and digitalizing cash transactions using a Distributed Ledger Technology. The digital currency may remain tied to fiat currency and may be regulated by a central entity (e.g. a federal country bank). This can prevent the volatility associated with traditional cryptocurrency systems and allow the central entity to maintain control over the monetary system.

In addition, there is also an opportunity to prevent use and redemption of counterfeit notes and enhance security. According to various embodiments, when an entity brings physical currency to the central entity for conversion to digital fiat currency, the conversion may be denied if the serial number of the physical currency indicates that the physical currency has already been converted. Accordingly, a counterfeit alert may be issued for the serial number, that may affect both the initial conversion and the subsequent request to covert. Monitoring redeemed serial numbers can further be used to prevent use of counterfeit physical notes, enhancing the security of the monetary system overall.

Embodiments, may also enhance the security by using a chip card and/or mobile phone secure element to store private key used to sign the transactions. In some embodiments, users may store private keys associated with a given amount/value of digital fiat currency on a smart card and transfer the given amount/value of digital fiat currency to another entity by simply transferring to the smart card to the recipient.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
receiving, by a central entity computer from a transaction processing network, a trusted certificate that grants permission to the central entity computer to generate or destroy digital currency, wherein the central entity computer is associated with a central bank;

receiving, by the central entity computer from a redeeming entity device associated with a bank granted permission by the transaction processing network to validate transactions, a request for digital currency, the request comprising a serial number and a denomination of a physical currency;

generating, by the central entity computer using the trusted certificate, the digital currency for the denomination and linked to the serial number, wherein the generating comprises recording the digital currency on a blockchain to a record that includes the serial number of the physical currency;

transmitting, by the central entity computer to the redeeming entity device, a notification of the generation of the digital currency; and causing, by the central entity computer, removal of the physical currency from circulation in a fiat currency system, wherein causing the removal of the physical currency from circulation includes physically destroying the physical currency, the physical currency being fiat currency.

2. The method of claim 1, further comprising:
associating the digital currency with a digital wallet using a private key stored to the digital wallet.

3. The method of claim 2, wherein the private key of the digital wallet is stored on a chip of a smart card or a secure element of a user device.

4. The method of claim 1, wherein, prior to transmitting the notification of the generation of the digital currency, the recording of the digital currency on the blockchain is validated by a plurality of validating entities.

5. The method of claim 1, wherein the digital currency is recorded on the blockchain using a public key of the central entity computer.

6. The method of claim 1, wherein the request for digital currency is a first request and the physical currency is a first physical currency, the method further comprising:
receiving, by the central entity computer, a second request for digital currency, the second request comprising a serial number and a denomination of a second physical currency, wherein the serial number and the denomination of the second physical currency are the same as the serial number and the denomination of the first physical currency;
determining, by the central entity computer, that the digital currency corresponding to the serial number and the denomination is already recorded on the blockchain; and
refraining from generating a second digital currency based on the second request.

7. The method of claim 1, wherein the blockchain includes a plurality of blocks, at least one block, of the plurality of blocks, storing data for a plurality of transactions, the plurality of transactions including a first record indicating that the digital currency for an amount associated with the denomination has been created, the first record including a public key associated with a digital wallet.

8. The method of claim 1, wherein the blockchain includes a plurality of blocks, at least one block, of the plurality of blocks, storing data for a plurality of transactions, the plurality of transactions including a second record recording the removal of the physical currency from circulation.

9. The method of claim 1, wherein recording the digital currency on the blockchain generates the record in a block in the blockchain, the record further comprising a currency type of the physical currency.

10. A central entity computer comprising:
a processor; and
a non-transitory computer-readable medium comprising code, executable by the processor, for implementing a method comprising:
receiving, by the central entity computer from a transaction processing network, a trusted certificate that grants permission to the central entity computer to generate or destroy digital currency, wherein the central entity computer is associated with a central bank;
receiving, by the central entity computer from a redeeming entity device associated with a bank granted permission by the transaction processing network to validate transactions, a request for digital currency, the request comprising a serial number and a denomination of a physical currency;
generating, by the central entity computer using the trusted certificate, the digital currency for the denomination and linked to the serial number, wherein the generating comprises recording the digital currency on a blockchain to a record that includes the serial number of the physical currency;
transmitting, by the central entity computer to the redeeming entity device, a notification of the generation of the digital currency, wherein, prior to transmitting the notification of the generation of the digital currency, the recording of the digital currency on the blockchain is validated by a plurality of validating entities; and
causing, by the central entity computer, removal of the physical currency from circulation in a fiat currency system.

11. The central entity computer of claim 10, further comprising:
associating the digital currency with a first digital wallet using a private key stored to the first digital wallet, wherein the private key of the first digital wallet is stored on a chip of a smart card or a secure element of a user device.

12. The central entity computer of claim 10, wherein the digital currency is recorded on the blockchain using a public key of the central entity computer.

13. A computer-implemented method comprising:
receiving, by a blockchain node storing a blockchain, a request to record an action relating to removal of physical currency with a denomination from a fiat currency system;
recording, by the blockchain node, a record of the action relating to the removal of the physical currency with the denomination from the fiat currency system to the blockchain, the record indicating that a particular unit of the physical currency has been removed from circulation;
receiving, by the blockchain node, a request to record digital currency in an amount equal to the denomination, the digital currency associated with a public key of a user; and
recording, by the blockchain node, the digital currency in an amount equal to the denomination, wherein the digital currency and the record of the removal are validated by a plurality of blockchain nodes using proof of stake consensus.

14. The method of claim 13, further comprising:
receiving, by the blockchain node, a request to record a transaction between a first user and a second user, the request including a public key of the first user, a public key of the second user, and a transaction amount; and
recording a record of the transaction between the first user and the second user, the record of the transaction including the public key of the first user, the public key of the second user, and the transaction amount in a block along with the action relating to removal of physical currency with a denomination from the fiat currency system to the blockchain.

15. The method of claim 14, the record further comprising a currency type of the physical currency.

16. The method of claim 13, wherein the digital currency in the amount equal to the denomination is recorded to a record, the record further comprising a currency type of the physical currency and a serial number of the physical currency.

17. The method of claim 13, wherein the blockchain node is a bank server computer.

\* \* \* \* \*